US010060336B1

(12) United States Patent
Wicks

(10) Patent No.: US 10,060,336 B1
(45) Date of Patent: Aug. 28, 2018

(54) VARIABLE COMPRESSION RATIO ENGINE AND METHOD FOR OPERATION THEREOF

(71) Applicant: Ford Global Technologies, LLC, Dearborn, MI (US)

(72) Inventor: Christopher Donald Wicks, Allen Park, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 15/624,336

(22) Filed: Jun. 15, 2017

(51) Int. Cl.
F02F 1/42 (2006.01)
F02B 29/02 (2006.01)
F02B 39/08 (2006.01)
F02B 63/04 (2006.01)

(52) U.S. Cl.
CPC ............. F02B 29/02 (2013.01); F02B 39/08 (2013.01); F02B 63/042 (2013.01)

(58) Field of Classification Search
CPC ................................. F02D 15/00; F02B 27/04
USPC ................................ 123/48 R, 193.5, 182.1
See application file for complete search history.

(56) References Cited

U.S. PATENT DOCUMENTS 3,782,354 A * 1/1974 Tuckey .................... F01L 13/08
123/182.1
3,893,440 A * 7/1975 Dooley .................... F01L 13/08
123/182.1
4,326,145 A * 4/1982 Foster .................... F02N 19/004
123/182.1
4,516,537 A * 5/1985 Nakahara ................ F02D 15/04
123/48 AA
4,738,110 A 4/1988 Tateno
4,987,863 A * 1/1991 Daly ........................ F02D 15/04
123/48 AA
5,101,776 A * 4/1992 Ma ........................... F02D 15/04
123/48 D
5,375,570 A * 12/1994 Swain ..................... F01L 13/08
123/182.1

(Continued)

OTHER PUBLICATIONS

Leone, T. et al., "Systems and Methods for Control of Turbine-Generator in a Split Exhaust Engine System," U.S. Appl. No. 15/145,686, filed May 3, 2016, 70 pages.

(Continued)

Primary Examiner — Marguerite McMahon
Assistant Examiner — James Kim
(74) Attorney, Agent, or Firm — Julia Voutyras; McCoy Russell LLP

(57) ABSTRACT

A method for operating an engine system is provided, the method may include varying a compression ratio of a cylinder by selectively releasing combustion charge from the cylinder through a cylinder bleed valve of a cylinder head, the cylinder bleed valve coupled to a bleed manifold with a turbine-generator, and varying combustion charge flow through a turbine-generator bypass conduit bypassing the turbine-generator based on engine operating conditions. In this way, the compression ratio may be varied by selectively bleeding combustion charge from the cylinder based on engine operating conditions to promote better engine performance. Additionally, the combustion charge bleed from the cylinder can routed around a turbine-generator to increase combustion efficiency during certain operating conditions, such as during start-up, to further improve engine performance.

20 Claims, 10 Drawing Sheets

(56) References Cited

U.S. PATENT DOCUMENTS

| | | | | |
|---|---|---|---|---|
| 5,377,642 A * | 1/1995 | Morrow | ............... | F01L 13/08 |
| | | | | 123/182.1 |
| 6,253,723 B1 * | 7/2001 | Edlund | ............... | F01L 13/08 |
| | | | | 123/182.1 |
| 6,708,654 B2 * | 3/2004 | Cowans | ............... | F02B 25/18 |
| | | | | 123/48 D |
| 6,892,688 B2 * | 5/2005 | Korenjak | ............... | F01L 13/08 |
| | | | | 123/182.1 |
| 2012/0174895 A1 * | 7/2012 | Rabhi | ............... | F02B 75/045 |
| | | | | 123/48 B |

OTHER PUBLICATIONS

Wicks, C., "Variable Compression Ratio Engine," U.S. Appl. No. 15/464,097, filed Mar. 20, 2017, 52 pages.

\* cited by examiner

VARIABLE COMPRESSION RATIO ENGINE AND METHOD FOR OPERATION THEREOF

FIELD

The present description relates generally to methods and systems for a variable compression ratio engine.

BACKGROUND/SUMMARY

Previous internal combustion engines have employed high compression ratios to increase combustion efficiency. However, difficulties may arise when starting engines having high compression ratios. For instance, torque requirements for starting engines with high static compression ratios may surpass the available torque generated by starter motors. Low ambient temperatures causing the viscosity of the oil to be increased may further exacerbate engine starting problems. Therefore, the engine compression ratio may be varied to improve start-up operation as well as during fluctuations in engine speed and load. For example, during start-up and during high engine loads, the engine's compression ratio may be decreased. Conversely, during low engine loads, the engine compression ratio may be increased. In this way, the engine's compression ratio may be adjusted to improve overall engine performance and efficiency.

Approaches of adjusting the compression ratio in the engine may include altering geometry of the combustion chamber and/or the piston as well as modifying other engine accessories. One example approach is shown by Ma, in U.S. Pat. No. 5,101,776. Therein, a variable compression ratio engine includes a combustion chamber connected to an auxiliary chamber via a flow passage having a poppet valve. To achieve low engine compression ratios, the poppet valve may be opened to allow flow of charge gas from the combustion chamber into the auxiliary chamber. Alternatively, high compression ratios in the engine may be achieved by closing the poppet valve to isolate the auxiliary chamber from the main combustion chamber.

However, the inventors herein have recognized potential issues with Ma's system as well as other engine systems for varying compression ratio. For example, the energy contained in the charge gas bled from the main combustion chamber into the auxiliary chamber may not be adequately recovered during engine operation. Attempts have been made to extract energy from charge gas bled from the cylinder. However, previous heat recovery systems can interfere with engine starting operation. Moreover, previous heat recovery systems are not capable of independently regulating the amount of heat recovered from the combustion charge and the flowrate of the combustion charge that is bleed from the cylinder. Therefore, previous variable compression ratio systems may have drawbacks, such as engine starting problems.

In one example, the issues described above may be addressed by a method for operating an engine system. The method may include varying a compression ratio of a cylinder by selectively releasing combustion charge from the cylinder through a cylinder bleed valve of a cylinder head, the cylinder bleed valve coupled to a bleed manifold with a turbine-generator, and varying combustion charge flow through a turbine-generator bypass conduit bypassing the turbine-generator based on engine operating conditions. In this way, the engine's compression ratio can be varied by bleeding combustion charge from the cylinder during desired time periods to enable improvements in combustion operation over a wide range of conditions. From the bleed manifold combustion charge can either be routed around a turbine-generator or to the turbine-generator. The path of the charge gas may be selected to increase engine efficiency. The flow path of the combustion charge, in one example, may be chosen based on conditions such as an engine start-up condition, exhaust gas recirculation (EGR) flowrate, an energy level in an energy storage device (e.g., a battery), etc. For instance, the combustion charge may be routed around the turbine-generator during start-up operation, to promote efficient engine starting (e.g., reduce engine starting toque requirements). Consequently, the path of combustion charge bleed from the cylinder can be adjusted to achieve increased start-up efficiency.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 3-5 are shown approximately to scale, although other relative dimensions may be used, if desired.

DETAILED DESCRIPTION

The following description relates to systems and methods for control of a variable compression ratio engine. Specifically, in one example a method for engine control may include releasing combustion charge through a bleed valve into a bleed manifold during selected operating conditions. The combustion charge in the bleed manifold can be directed either through a turbine-generator or through a bypass conduit routing combustion charge around the turbine-generator. The path of the combustion charge flow from the bleed manifold may be chosen, in one instance, based on engine operating conditions such as an engine start-up condition, exhaust gas recirculation (EGR) flow, and/or a state of charge of an energy storage device receiving energy from the turbine-generator. Specifically, in one example, combustion charge may be routed around the turbine-generator during start-up to reduce an amount of torque needed to start the engine. Subsequent to the start-up, the combustion charge may be routed to the turbine-generator to enable energy to be extracted from the charge. Consequently, combustion charge flow to the turbine-generator can be regulated to avoid undesirable impacts on start-up operation. In this way, energy can be efficiently extracted from the combustion charge only during selected time periods to prevent the turbine-generator from interfering with start-up, thereby improving overall engine efficiency and performance.

Figure 1:
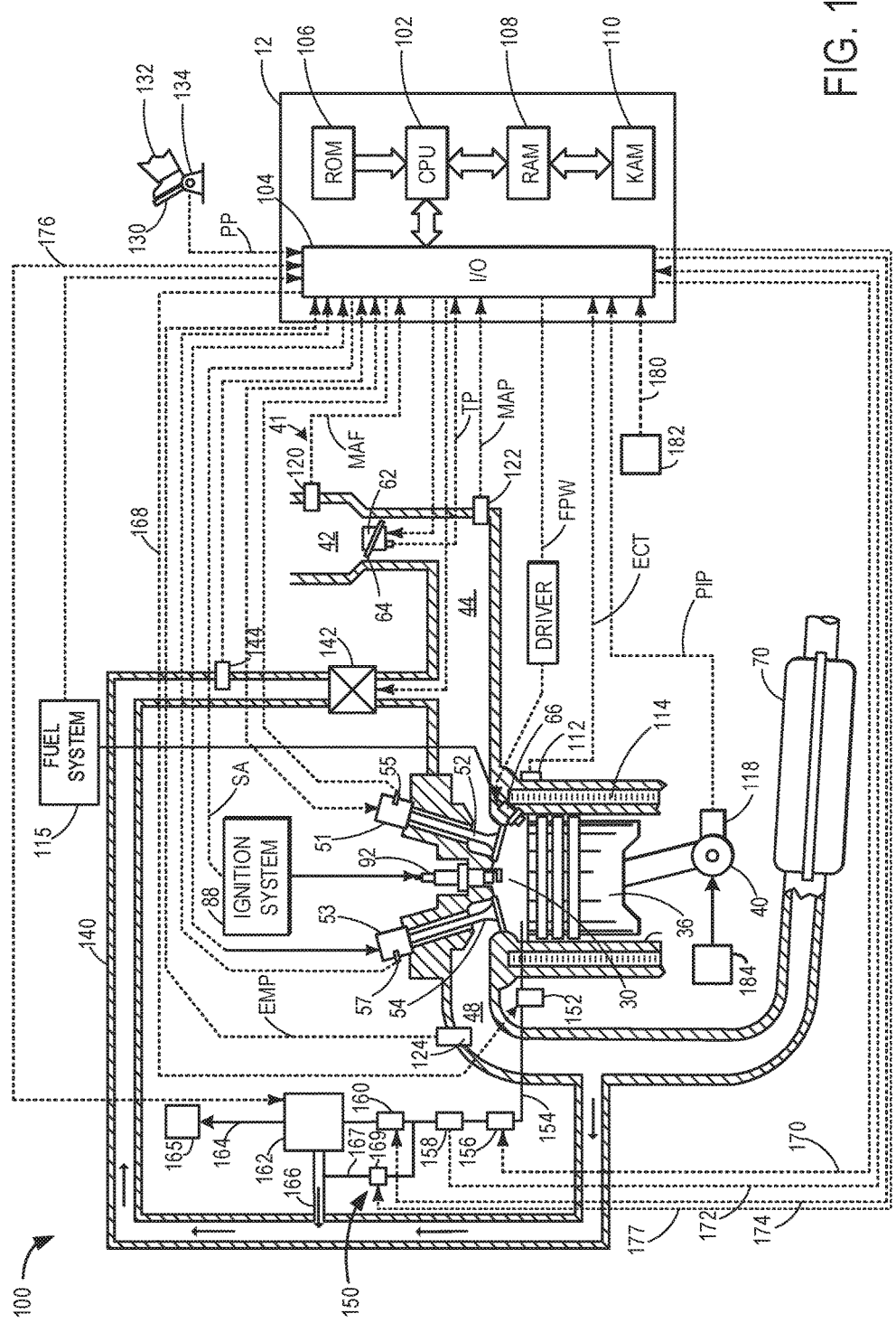
FIG. 1 shows a schematic depiction of an example engine system.
Figure 2:
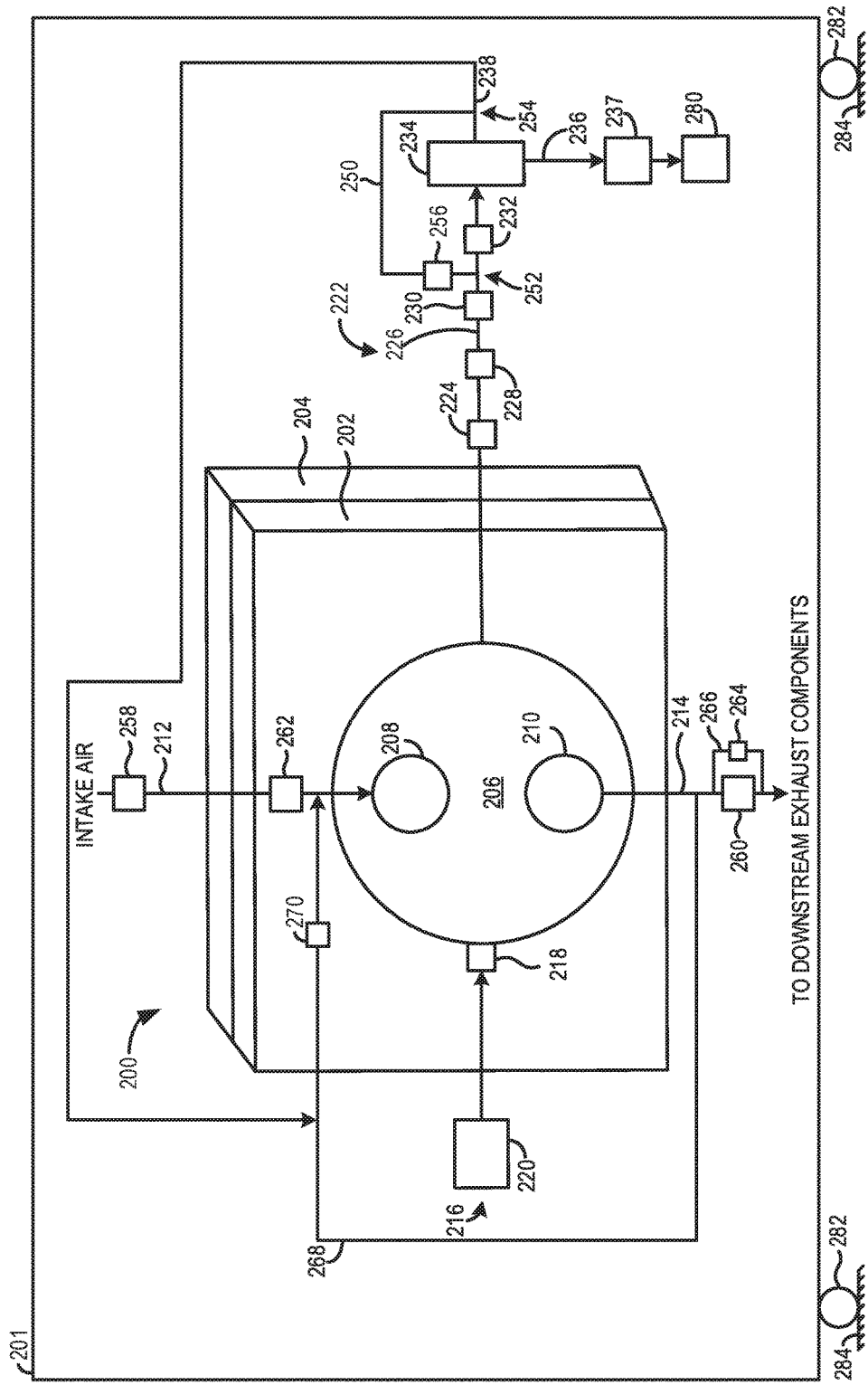
FIG. 2 shows a schematic depiction of an engine system comprising a cylinder head mounted to a cylinder block.
Figure 3:
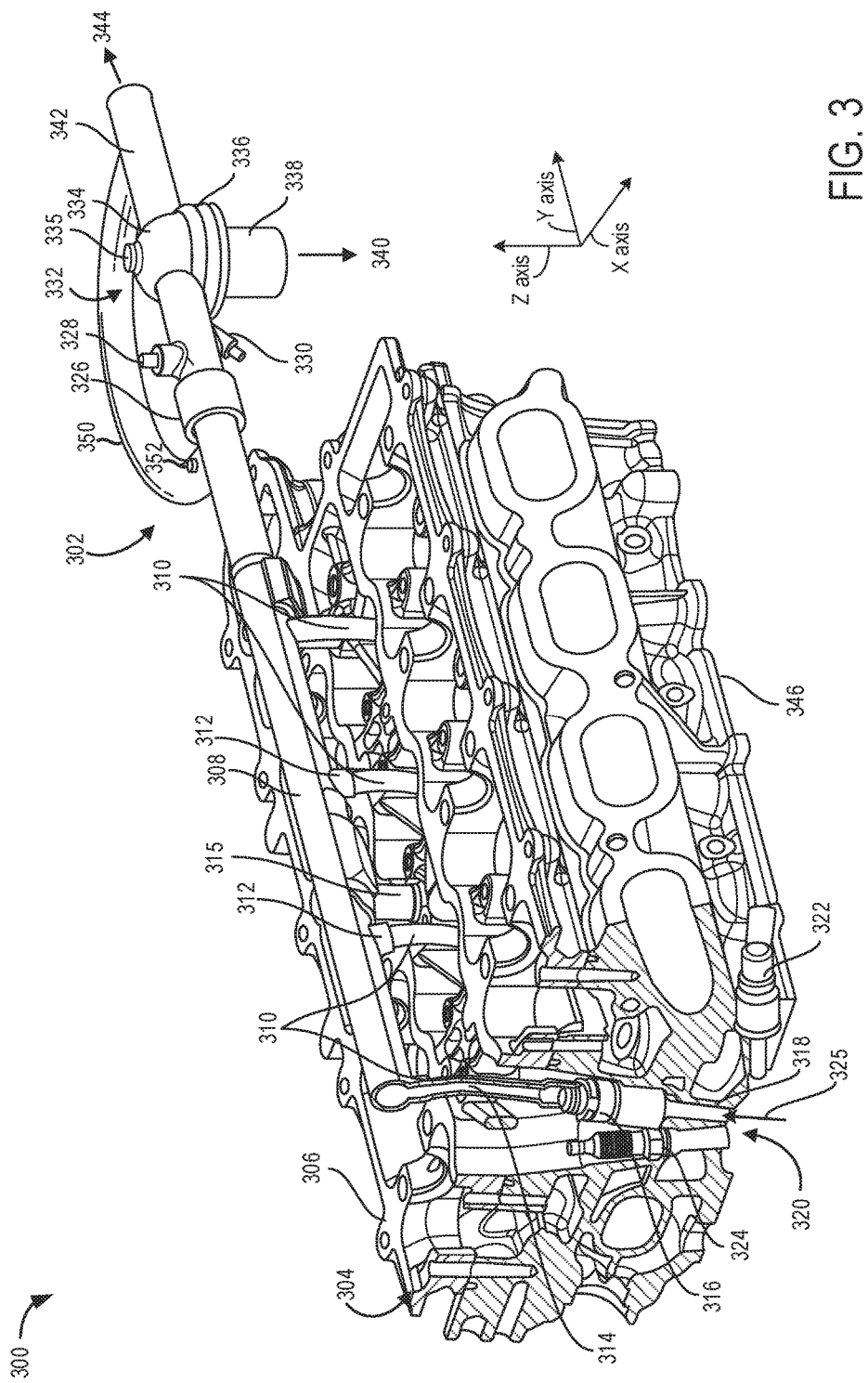
FIG. 3 shows a perspective sectional view of a manifold system attached to a cylinder head to divert combustion charge gas from one or more cylinders to a turbine-generator.
Figure 4:
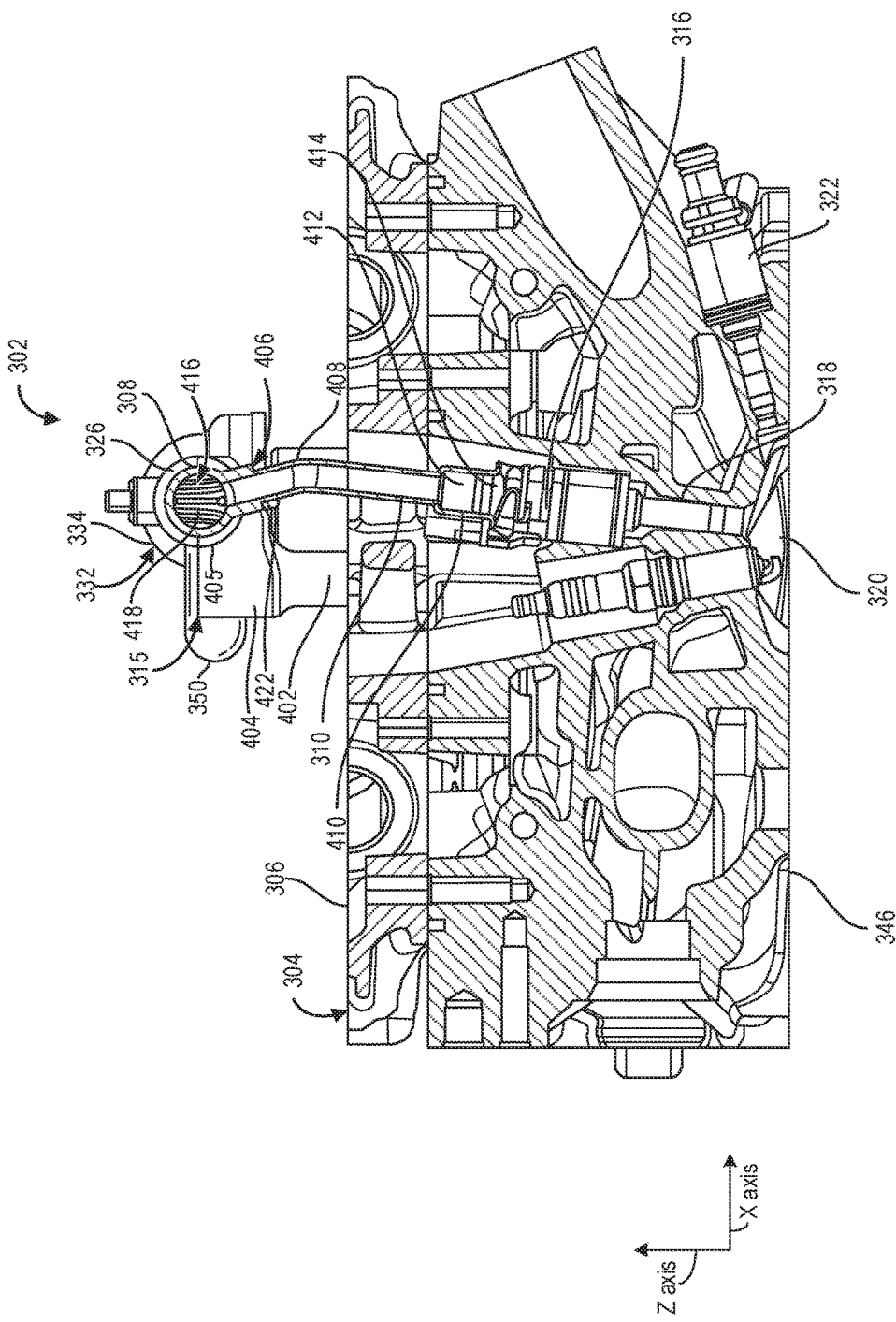
FIG. 4 shows a front sectional view of the manifold system attached to the cylinder head to divert combustion charge gas from one or more combustion chambers to the turbine-generator.
Figure 5:
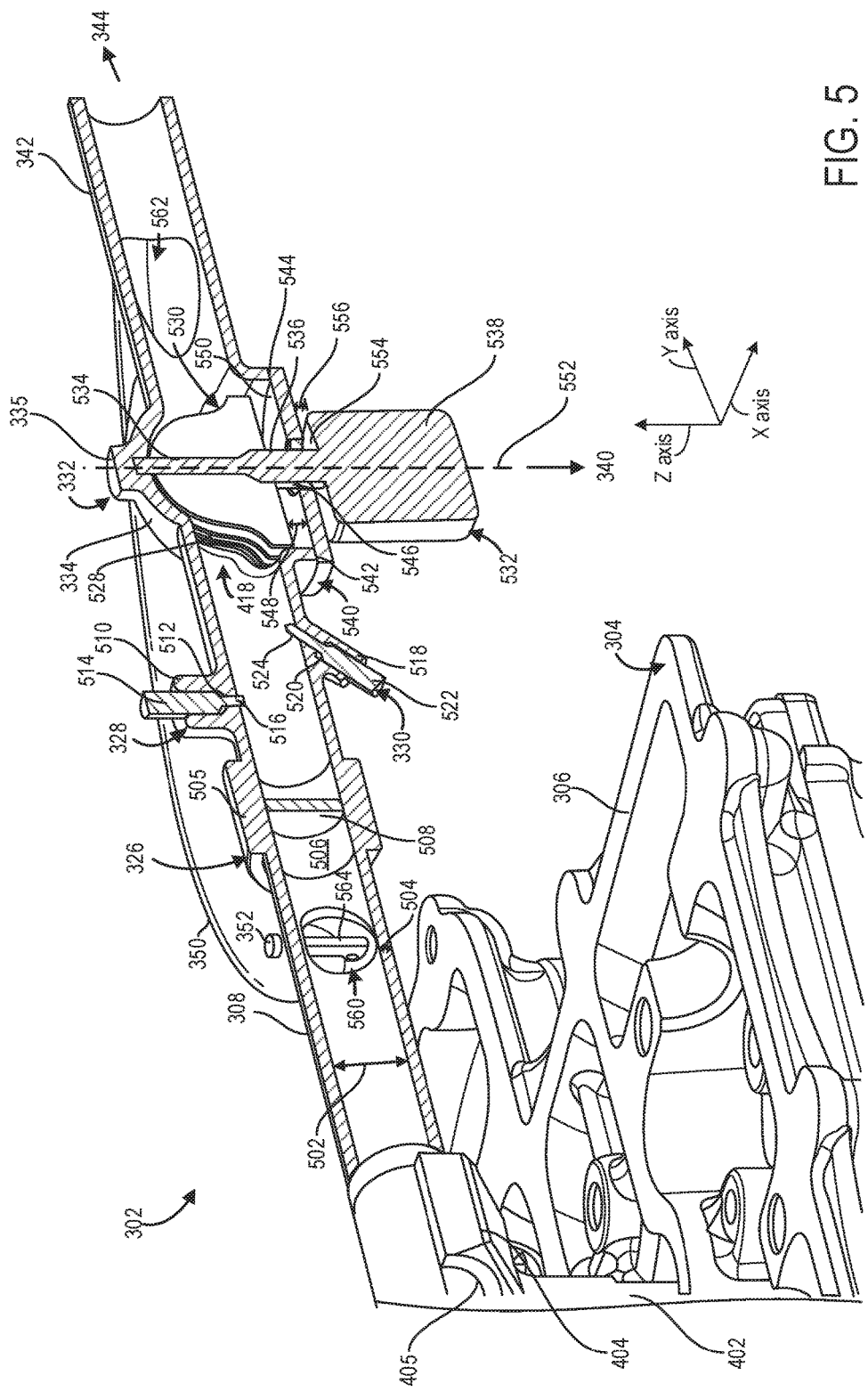
FIG. 5 shows a sectional view of the manifold system attached to the cylinder head.
Figure 6:
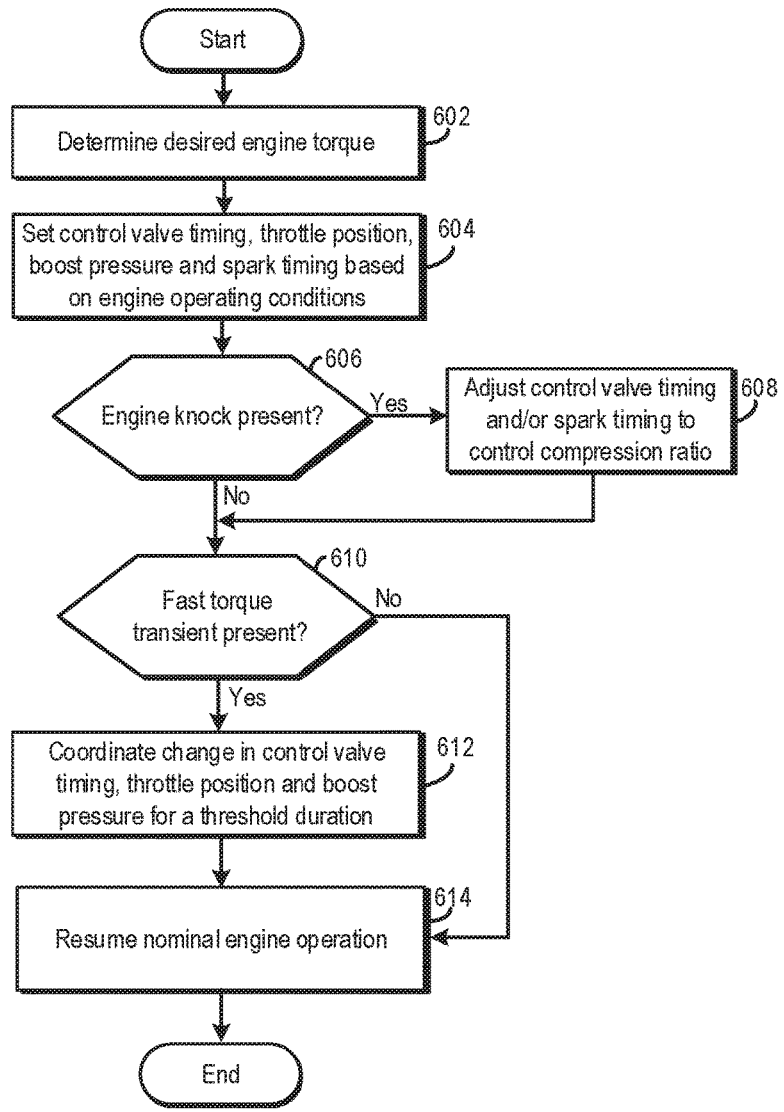
FIG. 6 shows a method for adjusting compression ratio in the engine to produce desired engine torque.
Figure 7:
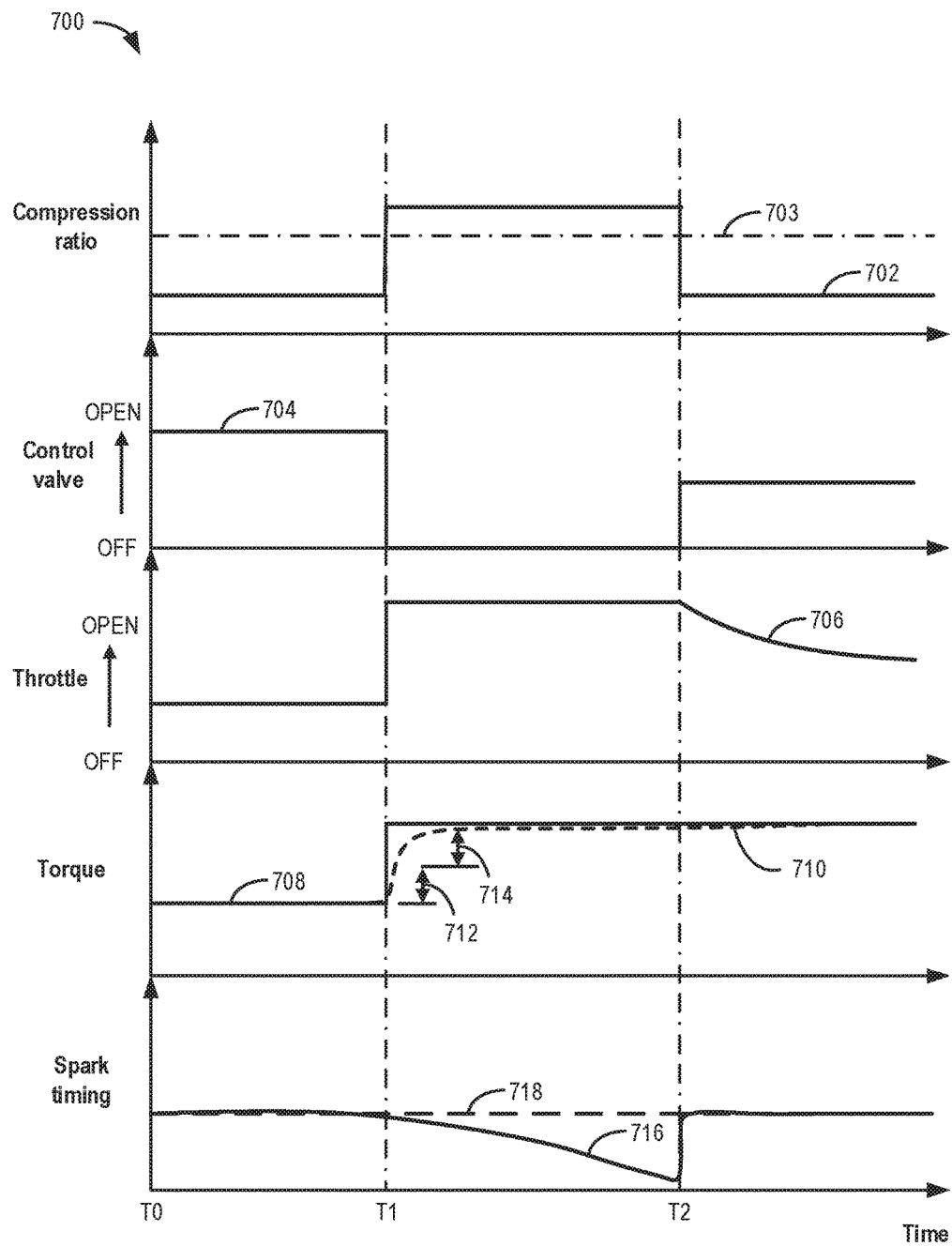
FIG. 7 shows a graphical depiction of compression ratio and engine torque adjustments based on changes in control valve position, throttle position, and spark timing.
Figure 8:
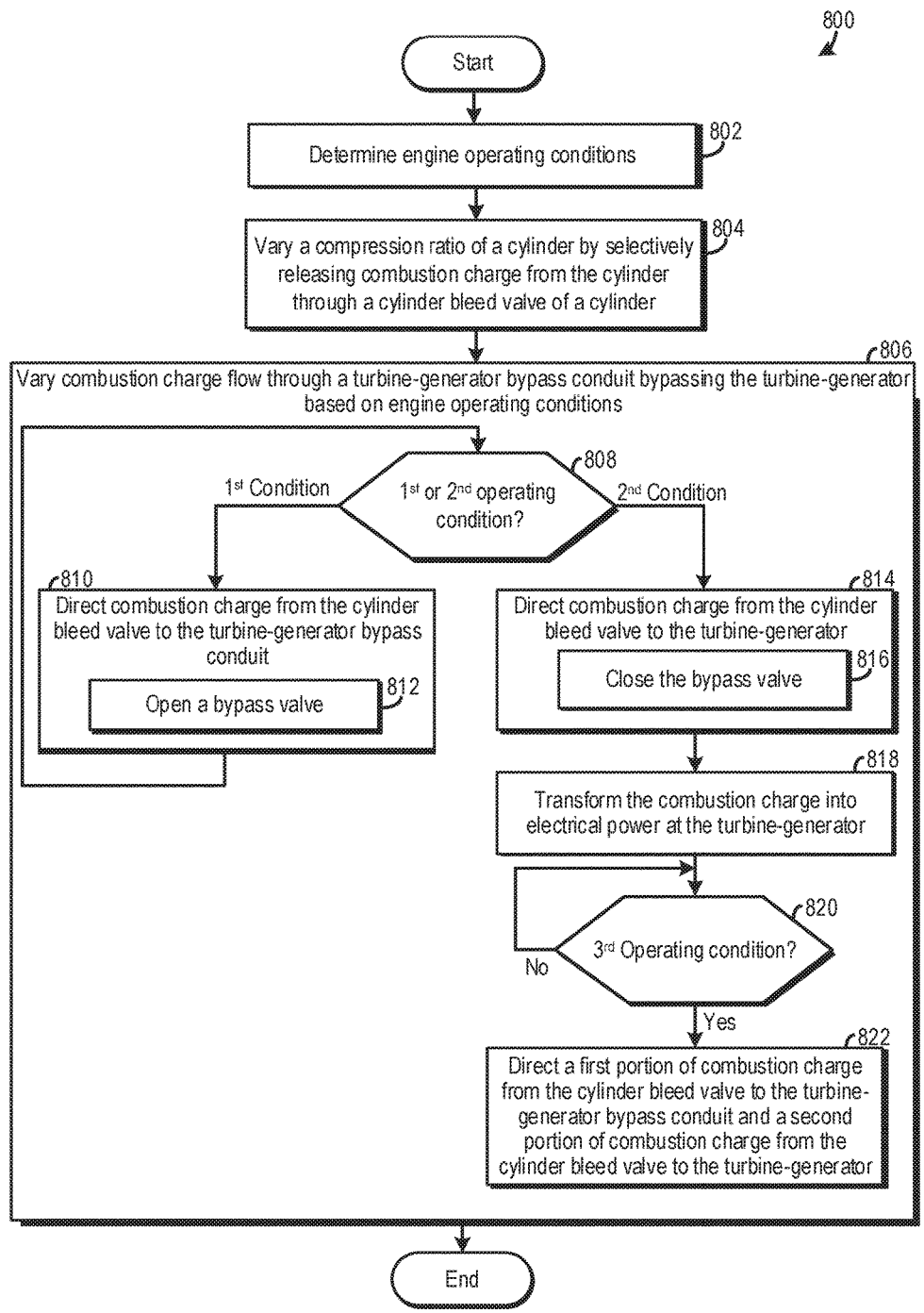
FIGS. 8 and 9 show methods for adjusting compression ratio in an engine as well as varying combustion charge flow through a turbine-generator bypass conduit.
Figure 9:
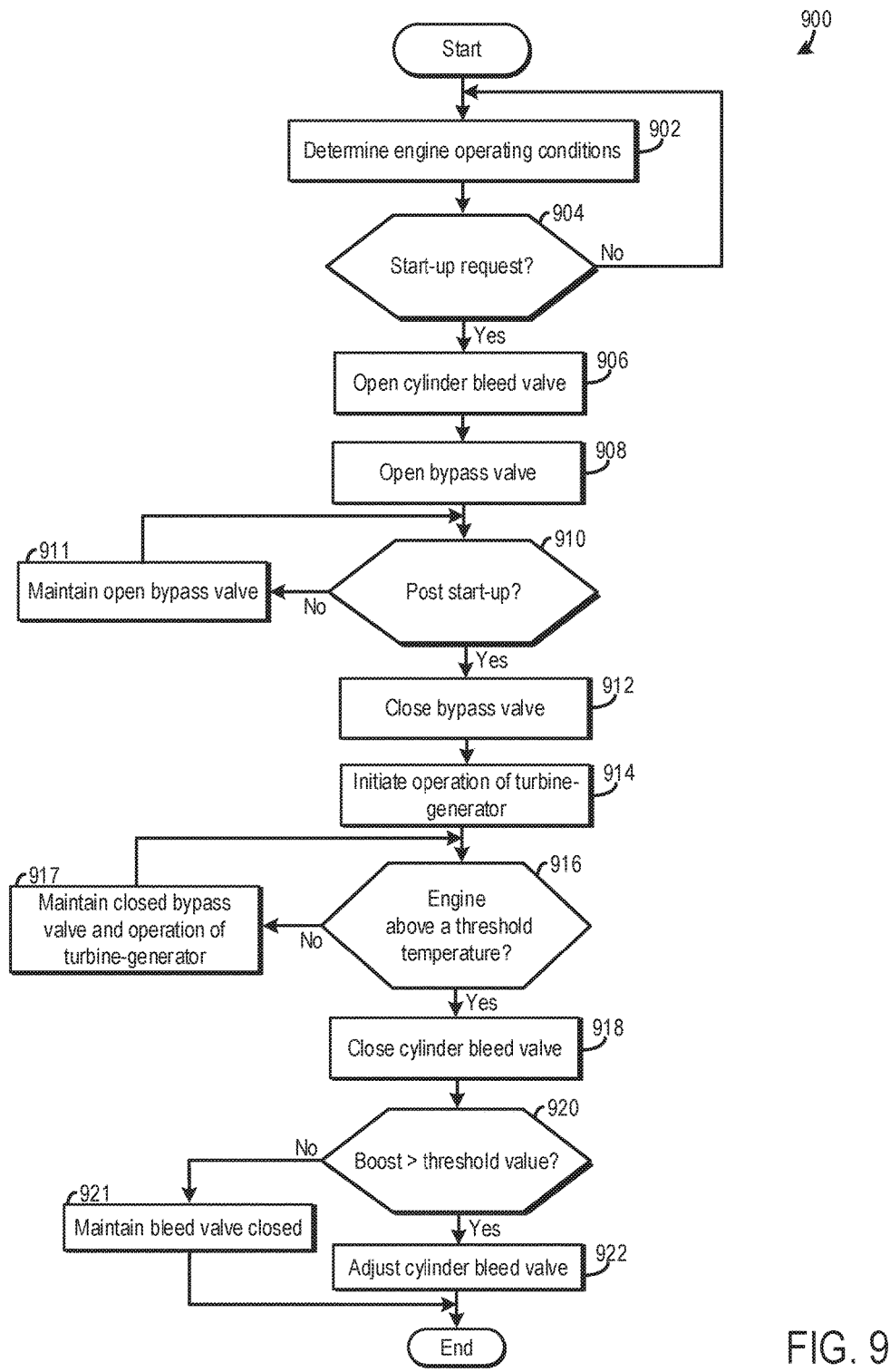
Figure 10:
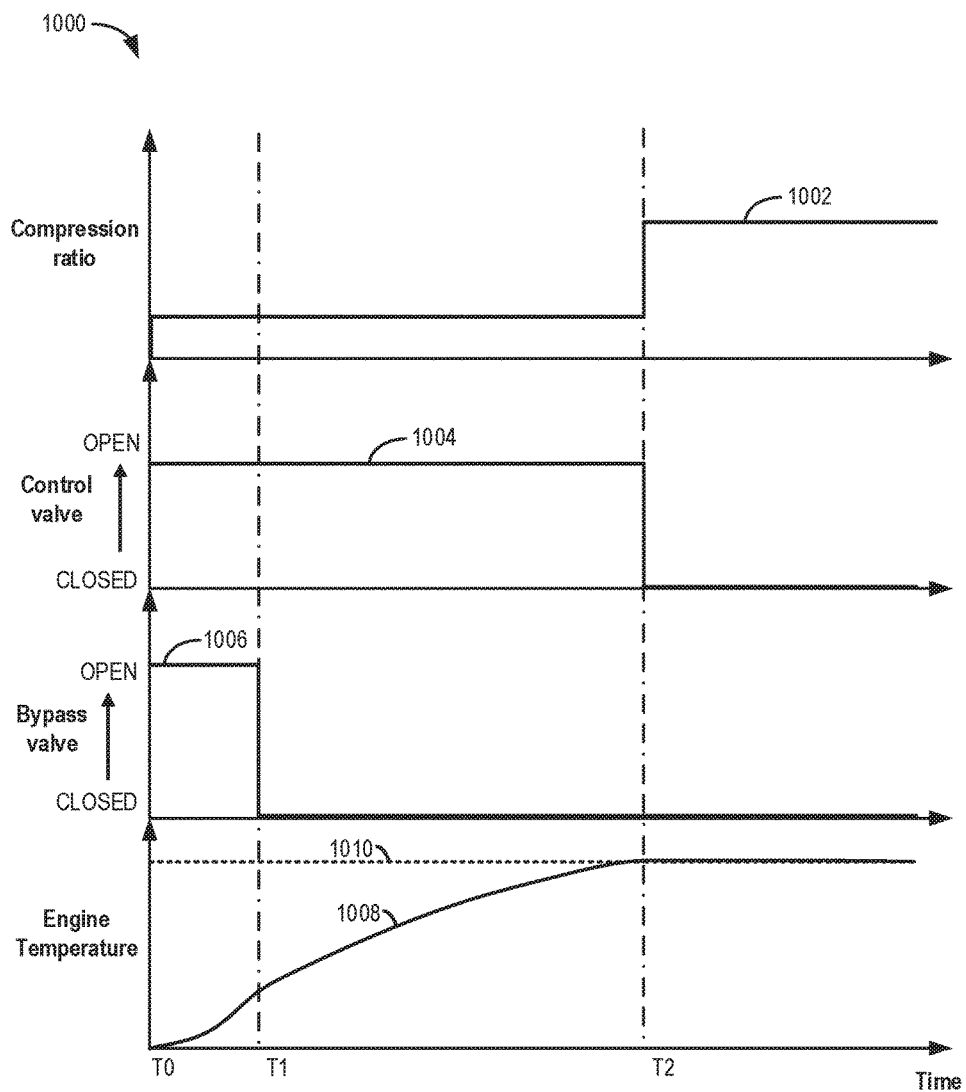
FIG. 10 shows a graphical depiction of compression ratio and combustion charge flow adjustment based on changes in engine temperature, control valve position, and bypass valve position.

FIG. 1 shows an engine system having a control valve that may be adjusted to vary the compression ratio in the engine by bleeding combustion charge gas from a combustion chamber to a manifold system coupled to a turbine-generator. The cylinder may be mounted to a cylinder block coupled to a cylinder head, as shown in FIG. 2. The manifold system coupled to the cylinder head, may include a manifold configured with an internal passage that conveys the combustion charge gas bled from the combustion chamber to the turbine-generator, as shown in FIGS. 3-5. An example method for adjusting the compression ratio in the engine having the control valve coupled to the combustion chamber and the manifold connected to the turbine-generator is shown in FIG. 6. The control valve timing, throttle position and/or spark timing may be adjusted to produce an example graphic output of compression ratio and engine torque, as shown in FIG. 7. FIGS. 8 and 9 show methods for adjusting a compression ratio in the engine and altering the combustion charge flow from a bleed valve to improve combustion operation. FIG. 10 shows an exemplary graphical depiction the control strategies illustrated in FIGS. 8-9.

Referring to FIG. 1, an engine 100 is shown with an intake system 41. The intake system 41 includes an intake passage 42. A throttle 62 having a throttle plate 64 may be positioned in the intake passage 42. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The combustion chamber may be referred to as a cylinder, in some examples. The position of throttle plate 64 may be provided to controller 12 by throttle position signal TP. Intake passage 42 may include a mass air flow sensor 120 and intake passage 44 may include a manifold air pressure sensor 122 for providing respective signals MAF and MAP to controller 12.

The combustion chamber 30 may be fueled via a fuel injector 66 supplied with fuel from fuel system 115. Ignition system 88 can provide an ignition spark to an air-fuel mixture in the combustion chamber 30 via spark plug 92 in response to spark advance signal SA from controller 12, under select operating modes. Though spark ignition components are shown, in some embodiments, combustion chamber 30 or one or more other combustion chambers of engine 100 may be operated in a compression ignition mode, with or without an ignition spark. Upon ignition, the air-fuel mixture in the combustion chamber 30 may combust to produce a combustion charge gas that provides energy required for piston movement.

A piston 36 is disposed in the combustion chamber 30 and is coupled to a crankshaft 40. Additionally, intake valve 52 is coupled to the combustion chamber 30 and configured to permit and inhibit intake airflow into the combustion chamber from the intake passage 44. Likewise, exhaust valve 54 is coupled to the combustion chamber and configured to permit and inhibit exhaust gas flow to the exhaust passage 48 from the combustion chamber 30. The intake valve 52 is actuated via an intake valve actuator 51 and the exhaust valve 54 is actuated by an exhaust valve actuator 53. Cam or electronic valve actuators have been contemplated. Sensor 55 provides an intake valve timing signal to the controller 12 and sensor 57 provides an exhaust valve timing signal to the controller 12. In one example, the intake valve actuator 51 and/or the exhaust valve actuator 53 may be configured to adjust (e.g., advance/retard) valve timing of the corresponding valve.

A manifold system 150 may be provided to vary the compression ratio in the engine 100. The manifold system 150 may also be referred to more generally as an engine system. The manifold system 150 may include a control valve 152 (e.g., cylinder bleed valve), a manifold 154 (e.g., bleed manifold), a check valve 156, charge gas sensor 158, an igniter 160, and/or a turbine-generator 162. When the control valve 152 is adjusted to an open valve position, the combustion charge gas in the combustion chamber 30 may be diverted into the manifold 154 in order to vary the compression ratio in the cylinder. Timing and duration of opening and closing of the control valve 152 may be adjusted based on engine operating conditions, such as engine speed and load. When metered combustion charge gas flows through a section of the manifold 154 past check valve 156, the gas sensor 158 detects any unburned fuel in the charge gas prior to entry to the turbine-generator 162. If unburned fuel is detected in the combustion charge gas, the igniter 160 may be switched on by controller 12 to combust the unburned fuel before the charge gas is flowed to the turbine-generator 162. The igniter 160 may be turned off when all the unburned fuel in the combustion charge gas is forced downstream into the turbine-generator 162 past the check valve 156 located upstream of the turbine-generator, and prevents any reversion or gas flow back upstream toward the combustion chamber so as to focus all the primary and/or secondary ignited combusted energy on the turbine wheel located within the turbine-generator 162. Upon entry into the turbine-generator 162, the combustion charge gas drives the turbine wheel to produce electrical energy which is directed to power demand centers, and/or to an energy storage device 165 (e.g., battery storage) to be used on demand, as shown by arrow 164. The battery charge may be used to operate the vehicle or run a supercharger compressor coupled to an engine in the vehicle. In another example, the battery charge may be used to power an electric motor, for instance.

The manifold system 150 also includes a turbine-generator bypass conduit 167 bypassing the turbine-generator 162 and the igniter 160. A bypass valve 169 is positioned in the turbine-generator bypass conduit 167. The bypass valve 169 is configured to regulate charge airflow through the turbine-generator bypass conduit 167.

Combustion charge from the turbine-generator bypass conduit 167 and/or residual exhaust gas in the turbine-generator 162 is flowed to the EGR system via an exhaust passage 166, in the illustrated example.

As elaborated in FIGS. 3-5, controller 12 may be used to adjust the valve positions of the control valve 152 and check valve 156 by sending signals 168 and 170, respectively to each valve. The controller 12 may also be used to control the igniter 160. For example, controller 12 may send signal 174 to turn on the igniter upon receiving signal 172 from the gas sensor 158 indicating unburned fuel in the combustion charge gas in the manifold 154. Performance of the turbine-generator 162 may be controlled via controller 12 based on engine operating conditions. For example, the turbine-generator 162 may receive signal 176 from the controller 12 when an amount of combustion charge gas delivered to the turbine-generator changes based on changes in engine speed and load change. Additionally, the bypass valve 169 may receive a signal 177 from the controller 12 to adjust a degree of opening of the valve based on conditions such as an engine start-up condition, EGR flowrate, turbine-generator temperature, etc. It will be appreciated, that adjusting the valve may include moving a valve plate in the valve via a valve actuator (e.g., electronic actuator) to adjust the flowrate of combustion charge bypass flow.

A pressure sensor 124 may be coupled to exhaust passage 48 downstream of exhaust valve 54 and upstream of emission control device 70. Pressure sensor 124 is preferably positioned close to exhaust valve 54 to measure the exhaust manifold pressure (EMP). In one embodiment, pressure sensor may be a pressure transducer. The engine controller may infer cylinder torque imbalance based on the weighted output of the pressure sensor.

Emission control device 70 is shown arranged along exhaust passage 48 downstream of the pressure sensor 124. The emission control device 70 may be a three way catalyst (TWC), configured to reduce NOx and oxidize CO and unburnt hydrocarbons. In some embodiments, device 70 may be a NOx trap, various other emission control devices, or combinations thereof.

Further, in the disclosed embodiments, an exhaust gas recirculation (EGR) system may route a desired portion of exhaust gas from exhaust passage 48 to intake passage 44 via EGR passage 140. The amount of EGR provided to intake passage 42 may be varied by controller 12 via EGR valve 142. Further, an EGR sensor 144 may be arranged within the EGR passage and may provide an indication of one or more of pressure, temperature, and concentration of the exhaust gas. Under some conditions, the EGR system may be used to regulate the temperature of the air and fuel mixture within the combustion chamber.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 100, in addition to those signals previously discussed, including measurement of inducted mass air flow (MAF) from mass air flow sensor 120; exhaust manifold pressure (EMP) from pressure sensor 124; engine coolant temperature (ECT) from temperature sensor 112 coupled to cooling sleeve 114; a profile ignition pickup signal (PIP) from Hall effect sensor 118 (or other type) coupled to crankshaft 40; a cylinder torque from the crankshaft torque sensor coupled to crankshaft 40; throttle position (TP) from a throttle position sensor 134; and absolute manifold pressure (MAP) signal from sensor 122. The throttle position sensor 134 is coupled to a pedal 130 actuated by an operator 132. Engine speed signal, RPM, may be generated by controller 12 from signal PIP. Controller 12 also may employ the various actuators of FIG. 1 to adjust engine operation based on the received signals and instructions stored on a memory of the controller. The crankshaft 40 may also receive rotational input from a starter motor 184 during start-up. The starter motor 184 may receive electrical energy from the energy storage device 165, for instance. The controller 12 is also shown receiving a signal 180 (e.g., key-on and/or a key-off signal) from an ignition switch 182. It will be appreciated that the ignition switch 182 may trigger start-up operation in the engine 100. In one example, start-up operation may include cranking the engine 100 with the starter motor 184, injecting fuel into the combustion chamber 30, and/or igniting the air fuel mixture in the combustion chamber using the ignition system 80 or by compression. Cranking the engine 100 may include powering the starter motor 184 to initiate rotation of the crankshaft 40. It will be appreciated that rotating the crankshaft 40 triggers movement of the piston 36 in the combustion chamber 30. Thus, in such an example, the engine may be operated in start-up mode in which one or more of the aforementioned actions are implemented. In a post start-up mode the engine may be operated to carry out four stroke combustion cycles imparting rotational input to the crankshaft from the piston.

Storage medium read-only memory 106 can be programmed with computer readable data representing non-transitory instructions executable by processor 102 for performing the methods described below as well as other variants that are anticipated but not specifically listed.

As described above, FIG. 1 shows only one cylinder of a multi-cylinder engine, and each cylinder may similarly include its own set of intake/exhaust valves, fuel injector, spark plug, etc.

Turning to FIG. 2, a schematic depiction of an engine 200 (such as engine 100 shown in FIG. 1) used to provide motive power to a vehicle 201, is shown. In the depicted example, the engine 200 includes a cylinder head 202 coupled to a cylinder block 204 forming a cylinder 206. The engine 200 is configured to implement combustion operation in the cylinder 206. An intake valve 208 is provided in the engine 200 to flow intake air into the cylinder 206 at selected time intervals. Correspondingly, an exhaust valve 210 is provided in the engine 200 to flow exhaust gas out of the cylinder 206 into a downstream exhaust system at selected time intervals. Although the engine 200 is depicted as having only a single cylinder, in other examples, the engine 200 may include more than one cylinder.

Arrow 212 represents the flow of intake air from upstream intake system components such as intake conduits, an intake manifold, a throttle, a compressor, etc., to the intake valve 208. On the other hand, arrow 214 represents the flow of exhaust gas to downstream components such as exhaust conduits, an exhaust manifold, emission control device(s), a turbine, etc., from the exhaust valve 210.

A fuel delivery system 216 is also provided in the engine 200. The fuel delivery system 216 is configured to provide fuel for combustion in the cylinder 206 at desired time intervals. The fuel delivery system 216 includes a direct fuel injector 218, in the illustrated example, and upstream components 220. The upstream components 220, such as fuel pumps, valves, conduits, etc., are configured to provide fuel to the fuel injector 218. However, a port injector configured to deliver fuel into a conduit upstream of the cylinder may be additionally or alternatively included in the fuel delivery system 216. The engine 200 is configured to implement a four stroke combustion cycle in the engine. The combustion strokes include an intake stoke, a compression stroke, a combustion stroke, and an exhaust stroke. An ignition device (not shown) may also be provided in the engine 200. The ignition device may be configured to provide spark to the cylinder 206 at selected time intervals. However, in other examples, the ignition device may be omitted from the engine and the engine may be configured to perform compression ignition, or may be a two cycle engine.

A manifold system 222 (such as manifold system 150 shown in FIG. 1) may be provided to receive combustion charge from one or more cylinders, thereby allowing compression ratio in engine 200 to be varied. The manifold system 222 may include a control valve 224, manifold 226 (e.g., bleed manifold), check valve 228, charge gas sensor 230, igniter 232, and the turbine-generator 234. When the control valve 224 is adjusted to an open valve position, combustion charge gas in the cylinder 206 may be diverted into the manifold 226 in order to adjust the engine's compression ratio. Timing and duration of opening and closing of the control valve 224 may be adjusted based on engine operating conditions, such as engine speed and load. When the check valve 228 is adjusted to an open valve position, the combustion charge gas flows through a section of the manifold 226 adjacent to the gas sensor 230 which detects any unburned fuel in the charge gas prior to entry to the turbine-generator 234 positioned downstream of the gas sensor. If unburned fuel is detected in the combustion charge gas, the igniter 232 is turned on to combust the unburned fuel before the charge gas flows into the turbine-generator 234. The igniter 232 may be turned off when all the unburned fuel in the combustion charge gas has been forced through the turbine-generator 234, the check valve 228 remains closed during this secondary combustion event to ensure no unwanted reversion back upstream of the turbine-generator. Upon entry into the turbine-generator 234, the combustion charge gas turns a turbine wheel (not shown) to produce electrical energy which is distributed to power demand centers, as shown by arrow 236. Residual exhaust gas in the turbine-generator 234 is diverted to an EGR system via an exhaust passage 238. In the illustrated example, electrical energy is delivered from the turbine-generator 234 to an energy storage device 237. Additionally or alternatively, electrical energy may be delivered directly to desired engine system(s) using electrical energy. In one example, the energy storage device 237 may provide electrical energy to an electric motor 280 that may provide rotational input to vehicle wheels 282 positioned on a driving surface 284. Thus, the vehicle may be a hybrid vehicle, in such an example. Numerous hybrid vehicle configurations have been contemplated such as mild hybrid configurations, parallel hybrid configurations, series hybrid configurations, etc.

A turbine-generator bypass conduit 250 (such as turbine-generator bypass conduit 167 shown in FIG. 1) included in the manifold system 222, is also shown in FIG. 2. The turbine-generator bypass conduit 250 is configured to bypass the turbine-generator 234 and the igniter 232. Specifically, the turbine-generator bypass conduit 250 includes an inlet 252 opening into the manifold 226 upstream of the igniter 232 and includes an outlet 254 opening into the manifold 226 downstream of the turbine-generator 234. A bypass valve 256 (such as the bypass valve 169 shown in FIG. 1) is positioned in the turbine-generator bypass conduit 250. The bypass valve 256 is configured to adjust the bypass flow through the turbine-generator bypass conduit 250. Specifically, the bypass valve 256 may be controlled using the strategies described herein with regard to FIGS. 8, 9, and 10.

FIG. 2 additionally, shows a turbocharger including a compressor 258 rotationally coupled to a turbine 260. The compressor 258 is shown positioned upstream of a throttle 262. The turbocharger further includes a wastegate 264 in a wastegate conduit 266. In the illustrated example, the wastegate conduit 266 bypasses the turbine 260. Additionally or alternatively, a bypass valve may be positioned in a conduit bypassing the compressor 258. Further, in other examples, the turbine may be omitted and the compressor 258 may receive rotational input from a crankshaft and/or an electric motor, to provide what may be referred to as supercharging.

The wastegate 264 may receive signals from a controller, such as controller 12 shown in FIG. 1, to vary the amount of boost provided to the cylinder 206 by the turbocharger. Thus, the wastegate 264 may be opened and closed based on command signals from a controller. Additionally or alternatively, the turbocharger may include a variable geometry turbine and/or compressor configured to augment the amount of boost provided to the cylinder.

FIG. 2 also shows an EGR passage 268 (such as the EGR passage 140, shown in FIG. 1). The EGR passage 268 includes an EGR valve 270 (such as EGR valve 142, shown in FIG. 1) coupled thereto. The EGR passage 268 receives outflow from the turbine-generator 234 and/or from the turbine-generator bypass conduit 250 when combustion charge is bleed from the cylinder 206 through the control valve 224. In this way, combustion charge can be directed to the intake system.

Referring to FIG. 3, a manifold system 302 is shown attached to a cylinder head 304 of an engine 300 (such as engine 100 shown in FIG. 1) to divert combustion charge gas from a plurality of cylinders to a turbine-generator 332 (e.g., electric turbine-generator), is disclosed. Coordinate axes X, Y, and Z are provided in FIG. 3, for reference. In one example, the Z axis may be parallel to a gravitational axis. Further, the X axis may be a lateral or horizontal axis and the Y axis may be a longitudinal axis. However, other coordinate axes orientations have been contemplated. The manifold system 302 may include a manifold 308, a control valve 316, check valve/filter 326, a charge gas sensor 328, an igniter 330, and/or a turbine-generator 332. The check valve/filter 326 may be a serviceable particulate filter and valve combination system, which controls flow of charge gas from manifold 308 into the turbine-generator 332 while filtering charge gas flowing through the manifold. The manifold system 302 may be mounted to an adjacent engine component such as a cam carrier, cam cover or secured to an outer face 306 of the cylinder head 304. In this example, the manifold system 302 may be mounted to a manifold mounting boss 315. An inner face 346 of the cylinder head 304 may be attached to a cylinder block (not shown) containing the plurality of cylinders. The combustion charge gas from the combustion chamber 320, as well as the combustion chambers hidden from view, may be diverted to the turbine-generator 332 via the manifold 308. The turbine-generator 332 may include a top portion 334, a middle portion 336 and a lower portion 338. The top portion 334 may include a protruding cap 335 attached to conical housing. The middle portion 336 may include a plurality of circular rings that transition to the lower portion 338 which includes a cylindrical tube. The lower portion 338 may connect to engine components that draw electrical power, as shown by arrow 340. Further, the turbine-generator 332 may be coupled to an exhaust passage 342 leading to an exhaust gas recirculation (EGR) system, positioned in a direction shown by arrow 344.

During engine operation, fuel may be injected into each combustion chamber 320 via a fuel injector 322 mounted to a side portion of the cylinder head. The injected fuel may mix with air delivered to the cylinder to produce an air-fuel mixture that is ignited by a spark plug 324. The ignited air-fuel mixture combusts to produce combustion charge gas which produces energy for operating the engine. Depending on engine operating conditions, the combustion charge gas in each combustion chamber 320 may be bled into flow line 318 to adjust the engine compression ratio. The combustion charge gas enters the flow line 318, as shown by arrow 325. The control valve 316, may be selectively adjusted to control an amount of the combustion charge gas delivered to the manifold 308. In some embodiments, the control valve 316 may be described as a cylinder bleed valve. In this case, the cylinder bleed valve is distinct from an exhaust valve of the cylinder head assembly.

A plurality of bleed lines 310 may be coupled to the manifold 308 via connectors 312, to allow flow of combustion charge gas from the combustion chamber 320 into the manifold, when the control valve 316 is adjusted to the open valve position. Each bleed line 310 may be adequately sized with an internal flow passage 314, which delivers combustion charge gas from the combustion chamber 320 to the manifold 308. As an example, during low engine loads, the control valve 316 may remain closed during moderately high engine loads, and may be adjusted to a first position wherein a first amount of combustion charge gas is bled off from the combustion chamber 320 into the manifold 308, and compression of an air-fuel mixture in the cylinder produces a first compression ratio. In another example, during high engine load, the control valve 316 may be adjusted to a second position, wherein a second amount of combustion charge gas is bled off from the combustion chamber 320 into the manifold 308, and compression of an air-fuel mixture in the cylinder produces a second compression ratio, lower than the first compression ratio. Alternatively, a duration of valve opening of the control valve may be adjusted to vary the engine compression ratio. In this way, engine compression ratio may be adjusted by varying the position of the control valve and/or duration of valve opening of the control valve. The check valve/filter 326 may open to allow positive flow downstream (to turbine-generator) while resisting or denying any reversion upstream of charge gas into the combustion chamber. As the combustion charge gas in the manifold 308 flows downstream toward the turbine-generator 332. The gas sensor 328 mounted to the manifold at a downstream position from the check valve/filter 326, may detect unburned fuel in the combustion charge gas. If any unburned fuel is detected in the manifold 308, the engine controller (such as controller 12, shown in FIG. 1) may turn on the igniter 330 to combust the unburned fuel in the combustion charge gas, before the charge gas flows into turbine-generator 332. The charge gas entering the turbine-generator 332, drives a turbine wheel to generate electrical power, which is transmitted to power demand centers of the engine. As an example, the electrical power generated by the turbine-generator 332 may be supplied to electrically operated engine components or vehicle electrical systems. In another example, the electrical power generated by the turbine-generator may be stored as usable electrical power in a battery coupled to the turbine-generator. Once, the combustion charge gas is converted into electrical power, any residual exhaust gas in the turbine-generator 332 is diverted to the exhaust passage 342, where the exhaust gas is diverted to the EGR system, as shown by arrow 344.

FIG. 3 also shows a turbine-generator bypass conduit 350 (such as the turbine-generator bypass conduit 250, shown in FIG. 2) and a bypass valve 352 (such as the bypass valve 256, shown in FIG. 2). It will be appreciated that the bypass valve 352 may be operated to adjust the amount of combustion charge flow through the turbine-generator bypass conduit 350. The bypass conduit 350 and the bypass valve 352 may be included in the manifold system 302.

FIG. 4 shows a front view of the manifold system 302 attached to the cylinder head 304 to divert combustion gas from the combustion chamber 320, as well as the remaining combustion chambers hidden from view, to the turbine-generator 332. Coordinate axes X and Z are provided in FIG. 4, for reference. The manifold system 302 may be mounted to the cylinder head 304 via the manifold mounting boss 315 secured to the outer face 306 of the cylinder head. As an example, the manifold mounting boss 315 may be secured to the cylinder head using a clamp or any other suitable means of mechanical assembly.

As shown in FIG. 4, the manifold mounting boss 315 may include a vertical column 402 that connects to a mounting pad 404 having a curved annular portion 405. The mounting pad 404 may be a horizontally extended arm that couples to an external portion of the manifold 308, for example. The manifold 308 may be fluidly coupled to the bleed line 310 at a first end 406, which may be positioned above a curved junction 408 of the flow line. A second end 410 of the bleed line 310 may include a seal cup 412 that may be adequately sized to receive an O-ring seal 414 of the control valve 316. When the control valve 316 is adjusted to an open valve position, combustion charge gas from the combustion chamber 320 may flow into the manifold 308. As an example, the degree of valve opening may be adjusted to allow for a variable flow of combustion charge gas from the combustion chamber 320 into the manifold system 302, thereby allowing engine compression ratio to vary based on engine operating conditions, such as engine speed and load. Further, the control valve 316 may be adjusted to a closed valve position to stop flow of combustion charge gas from the combustion chamber 320 into the manifold 308. By adjusting flow of combustion charge gas from the combustion chamber 320 into the manifold system 302, the engine compression ratio may be adjusted based on engine load-speed and other engine parameters.

The check valve/filter 326 may be coupled to the manifold 308, to control reverse flow of the combustion charge gas back or (upstream) into the combustion chamber. Check valve/filter 326 allows combustion gas flow downstream into the turbine-generator 332. In this case, the manifold 308 is fluidly coupled to the turbine-generator 332, thereby allowing combustion charge gas flow from the combustion chamber into the turbine-generator 332. The combustion charge gas entering the turbine-generator 332 drives a wheel 418, mounted inside an interior region 416 of the turbine-generator to produce electrical power, which is transmitted to power demand centers of the engine. As an example, the released combustion charge gas is transformed into usable electrical power which may be stored as usable electrical power in a battery coupled to the turbine-generator. In a further example, the engine may be coupled in a hybrid vehicle which may be propelled using motor torque derived from an electrical motor driven by electrical power drawn from the battery. When the engine attains a designated torque or a threshold speed, for example, the control valve 316 may be adjusted to a closed valve position. When the control valve 316 is adjusted to a closed valve position, no combustion charge gas flows into the manifold 308 or turbine-generator 332.

The turbine-generator 332 may include a protruding portion 422 with an internal slot that may be adequately sized to receive a mounting rod to secure the turbine wheel 418 to the interior region 416 of the turbine-generator, as disclosed further with reference to FIG. 5. FIG. 4 also shows the turbine-generator bypass conduit 350 providing a bypass route around the turbine-generator 332, discussed in greater detail herein.

In this way, the manifold system 302 may include the manifold 308 configured with an internal passage that diverts combustion charge gas from the combustion chamber 320 into the turbine-generator when both the control valve 316 is adjusted to the open valve position. By adjusting flow of combustion charge gas from the combustion chamber 320 into the manifold system 302, the engine compression ratio may be varied while producing electrical energy from a portion of combustion charge gas bled from each combustion chamber 320. FIG. 4 also shows the flow line 318, the fuel injector 322, the inner face 346 of the cylinder head 304, and the top portion 334 of the turbine-generator 332.

FIG. 5 shows a cross-sectional view of the manifold system 302 attached to the outer face 306 of the cylinder head 304. Coordinate axes X, Y, and Z are provided in FIG. 5, for reference. As shown in FIG. 5, a portion of the manifold system 302 includes the manifold 308, check valve/filter 326, gas sensor 328, igniter 330, and turbine-generator 332 coupled to the exhaust passage 342 that leads to the EGR system.

The manifold 308 may be mounted to the cylinder head 304 via the mounting pad 404 connected to the vertical column 402 of the manifold mounting boss 315, shown in FIGS. 3-4. When mounted to the manifold mounting boss, the manifold 308 may be in face-sharing contact with the annular portion 405 of the mounting pad 404. The manifold 308 may be securely held in place by the mounting pad 404, thereby allowing a downstream end of the manifold system 302, including the turbine-generator 332 to be supported by the manifold mounting boss. The manifold 308 may be an annular pipe adequately sized with an internal diameter 502 that allows for a wide flow range of combustion charge gas from the cylinder to the turbine-generator 332. As an example, the internal diameter 502 of the manifold 308 may be selected to range from 19 mm to 21 mm. In another example, the manifold 308 may have a wall thickness 504 with a first range of 1.8 mm to 2.5 mm for a first position of the manifold 308 from the combustion chamber 320 to the check valve/filter 326, and a second range of 2.8 mm to 3.2 mm for a second portion of the manifold 308 from the check valve/filter 326 to the turbine-generator 332. The manifold 308 may be constructed out of a durable material such as ASTM A268 UNS S40900 or other suitable material that withstands high temperatures of the combustion charge gas bled from one or more combustion chambers.

A portion of the combustion charge gas in each engine cylinder may be diverted into the manifold system 302 via a control valve (such as control valve 316 shown in FIGS. 3-4) that is adjusted to an open valve position. As an example, the control valve may be adjustable between a minimum angle and a maximum angle, wherein when adjusted to the minimum angle no flow or a low amount of charge gas flows from the combustion chamber into the manifold, and when adjusted to the maximum angle, a large amount of charge gas flows into the manifold. The check valve/filter 326, coupled to the manifold 308, may be provided to control flow of combustion charge gas from the manifold 308 to the turbine-generator 332. The check valve/filter 326 may include an annular body 505 configured with an internal passage 506 having a sealing plate 508. As an example, the check valve/filter 326 may be configured as a valve and filter combination. The internal passage 506 may be sized with an internal diameter that adequately conveys flow of combustion charge gas from the manifold 308 into the turbine-generator 332. The sealing plate 508 may be adjusted via a controller (such as controller 12 shown in FIG. 1) to an open plate position, to allow flow of combustion charge gas from the manifold 308 into the turbine-generator 332 during engine operation. As an example, the sealing plate 508 may be adjusted to a partially or a fully open plate position, thereby allowing a wide flow range of combustion charge gas from the manifold 308 into the turbine-generator 332. In other examples, the sealing plate 508 may be adjusted by the controller to a closed plate position, to stop flow of combustion charge gas from the manifold 308 into the turbine-generator 332. In yet another example, the check valve/filter 326 may be a passively operated valve that opens when the pressure in the manifold 308 upstream of the valve is above a threshold value and closes when the pressure in the manifold is below the threshold value.

The gas sensor 328, positioned downstream of the check valve/filter 326, may be configured to detect any unburned fuel in the combustion charge gas prior to entry in the turbine-generator 332. As an example, the gas sensor 328 may include annular section 510 having an opening 512 sized to receive a sensing element 514 with a sensing tip 516. In one example, the sensing element 514 may be positioned in the opening 512 such that a portion of the sensing element extends outward from the annular section 510, and the sensing tip 516 extends into an interior region of the manifold 308. The gas sensor 328 may sense unburned fuel in the combustion charge gas by measuring or estimating a hydrocarbon content of the charge gas, for example. The measured or estimated hydrocarbon content of the combustion charge gas may be compared to a threshold hydrocarbon level to determine an amount of unburned fuel in the charge gas. If the measured or estimated hydrocarbon content in the combustion charge gas exceeds the threshold hydrocarbon level, then the charge gas is deemed to contain unburned fuel. Alternatively, if the measured or estimated hydrocarbon content in the combustion charge gas is below the threshold hydrocarbon level, the charge gas may be considered free of unburned fuel. In alternative examples, the gas sensor 328 may sense the amount of unburned fuel in the combustion charge gas based on fuel properties other than the hydrocarbon content.

If unburned fuel is detected in the combustion charge gas, then the igniter 330 may be turned on by the controller to combust any unburned fuel, flowing downstream of the check valve/filter 326, before the charge gas enters the turbine-generator 332. The igniter 330 may include an annular section 518 having an opening 520 sized to receive an ignition rod 522. As an example, the ignition rod 522 may include an ignition tip 524 that extends into the interior region of the manifold 308. When turned on, the ignition tip 524 may be in contact with the combustion charge gas to provide an initial spark to ignite the fuel in the charge gas. In this way, the unburned fuel in the combustion charge gas may be combusted prior to entry into the turbine-generator 332. By combusting any unburned fuel in the combustion charge gas, efficiency of the turbine-generator 332 may be improved while reducing the amount of uncombusted fuel flowing downstream to the EGR system.

The turbine-generator 332 may include the turbine wheel 418 mounted inside an internal opening 530 formed in the top portion 334. The turbine wheel 418 may be mounted to the turbine-generator 332 via a frame 532 having a shaft 534, a middle section 536 and a bottom section 538. The shaft 534 of the frame 532 may be secured in an aperture formed in the top portion 334 of the turbine-generator 332. A lower portion of the internal opening 530 may be closed off by a plate 540. As an example, the plate 540 may be a circular plate enclosing the lower portion of the internal opening 530. A portion of the manifold 308 may connect to a first portion of the plate 540 forming a first contact interface 542, and a portion of the exhaust passage 342 may connect to a second portion of the plate 540 forming a second contact interface 544. A slot 546, formed in a central section of the plate 540 may be adequately sized to receive a portion of the middle section 536 of the frame 532, which extends into the internal opening 530. When mounted to the top portion 334, the turbine wheel 418 may form a clearance 548 between a bottom end of the turbine wheel 418 and internal surface 550 of the plate 540. As an example, the clearance 548 may be adequately sized to allow rotation of turbine wheel 418 about an axis 552 of the turbine-generator 332. The combustion charge gas entering the turbine-generator 332 drives the turbine wheel 418 to produce electrical power, which is transmitted to power demand centers of the engine or stored in a battery, as shown by direction arrow 340. The battery charge may be used to operate the vehicle or run a supercharger compressor coupled to an engine on the vehicle. An outer surface 554 of the bottom section 528 may be positioned below the plate 540, forming a clearance 556 between the bottom section 538 and plate 540. Once, the combustion charge gas is converted into electrical power, any residual exhaust gas in the turbine-generator 332 is diverted to the exhaust passage 342, where the exhaust is delivered to the EGR system, as shown by arrow 344.

In this way, the manifold 308 may be provided to divert combustion charge gas from the cylinder into the turbine-generator 332 when the control valve is adjusted to the open valve position. By adjusting flow of combustion charge gas from the cylinder, compression ratios in the engine may be varied based on engine operating conditions while producing electrical energy to operate engine components and vehicle systems.

FIG. 5 also depicts the turbine-generator bypass conduit 350 and the bypass valve 352. The bypass conduit 350 includes an inlet 560 opening into the bleed manifold 308 upstream of the check valve/filter 326, the igniter 330, and the turbine-generator 332. The turbine-generator bypass conduit 350 also includes an outlet 562 opening into the exhaust passage 342 leading to the EGR system. The outlet 562 is positioned downstream of the turbine-generator 332. Additionally, the bypass valve 352 includes a valve plate 564. The valve plate 564 is adjustable to permit and inhibit (to a lesser or greater extent) combustion charge flow through the turbine-generator bypass conduit 350. In this way, combustion charge can be selectively routed around the turbine-generator 332. The bypass valve 352 may adjusted in response to command signals sent from a controller, such as the controller 12, shown in FIG. 1. Specifically, in one example, command signals sent to the bypass valve 352 may trigger an actuator that moves the valve plate 564 to increase or decrease the flowrate of charge gas through the bypass conduit 350.

Referring to FIG. 6, method 600 depicts an example method for controlling compression ratio in an engine having a control valve (e.g., control valve 316 shown in FIGS. 3-4) coupled to a cylinder and a manifold (e.g., manifold 308 shown in FIGS. 3-5) connected to a turbine-generator (e.g., turbine-generator 332 shown in FIGS. 3-5). The method may enable engine compression ratio to be adjusted to threshold levels that minimize occurrence of engine knock while promoting improved engine performance.

Instructions for carrying out method 600 and the rest of the methods included herein may be executed by a controller based on instructions stored on a memory of the controller and in conjunction with signals received from sensors of the engine system, such as the sensors described above with reference to FIGS. 1-5. The controller may employ engine actuators of the engine system to adjust engine operation, according to the methods described below. The method of FIG. 6 may be used in conjunction with systems of FIGS. 1-5.

At 602, method 600 may include determining desired engine torque based on engine operating conditions. As an example, engine operating conditions may include but are not limited to engine speed, engine load, accelerator position, vehicle speed, engine temperature, knock propensity, and combustion charge mass flow.

Next, at 604, the method may include setting a control valve timing, spark timing, throttle position and boost pressure based on engine operating conditions and desired torque. For example, the control valve timing, spark timing, throttle position and boost pressure may be set based on engine load-speed and/or engine torque. In one example, the control valve coupled to each cylinder (e.g., the control valve 316 coupled combustion chamber 320 shown in FIG. 4) may be adjusted to a closed valve position during high engine load and high engine speed. This may allow the engine to be operated at a higher compression ratio while producing adequate torque to meet the high engine load. In other examples, the control valve may be adjusted to an open valve position during low to moderate engine load-speed. In this case, a portion of combustion charge gas in one or more cylinders, may be bled into the manifold to vary the compression ratio. The charge gas in the manifold may be further flowed into a turbine-generator (e.g., turbine-generator 332 shown in FIGS. 3-5). In still another example, the control valve may be partially opened, a degree of opening of the valve adjusted to provide a sufficient margin to reduce occurrence of knock. For example, as a knock propensity of the cylinder increases, the degree of opening of the control valve may be increased. In response to an indication of knock, the control valve opening may be further adjusted (e.g., increased) so as to provide rapid knock relief.

Similarly, the spark timing, throttle position and boost pressure may be adjusted (based on engine load and speed) to vary the compression ratio. For example, at higher engine speeds and loads, spark timing may be slightly retarded from maximum brake torque (MBT) while an intake throttle is held more open so as to slightly reduce the compression ratio and provide some knock relief. In still other examples, at high engine speed and load, a compression recirculation valve coupled across an intake compressor may be held partially open so as to provide some margin to surge. In response to a tip-out, when surge can occur, the compressor recirculation valve may be rapidly transitioned to a fully open position to reduce boost pressure and move the engine away from surge.

Upon determining settings for the control valve, spark timing, throttle position and boost pressure, the method 600 may proceed to 606. At 606, the method 600 may include determining if engine knock is present. Engine knock may occur when a temperature and pressure of air-fuel mixture in an engine cylinder exceeds a threshold level and causes the mixture to auto ignite. This may produce a shock wave that may generate a rapid increase in cylinder temperature and pressure which may cause damage to engine components. The presence of engine knock may be determined by a knock sensor mounted to the engine to measure engine vibration, for example.

If engine knock is detected, the method may proceed to 608. At 608, the method 600 may include adjusting the control valve timing or spark timing or both control valve timing and spark timing to control the compression ratio and mitigate knock. By adjusting the control valve or spark timing, the compression ratio may be decreased to reduce cylinder temperature and pressure.

As such, knock may be mitigated by retarding spark timing. However, spark retard usage results in a fuel penalty. Knock may also be mitigated by reducing the compression ratio of the knocking cylinder by increasing an opening of the control valve. While this results in a drop in torque and engine performance, at least a portion the engine work dissipated via the opening of the control valve may be recovered via operation of the turbine-generator coupled downstream of the control valve. In response to an indication of knock, the controller may compare the fuel penalty associated with spark retard usage to the engine performance loss associated with control valve opening (taking into account engine performance recovered via the electric turbine) and select a knock mitigating action accordingly. For example, when the fuel penalty associated with spark retard usage is lower, spark timing may be retarded from MBT to mitigate knock. In comparison, when the engine performance loss associated with control valve opening is lower, the control valve may be moved to a more open position (from its current position) while maintaining spark timing at MBT.

In one example, where control valve adjustment is selected for knock mitigation, the control valve may be moved from the partially open position to a more open (e.g., fully open) valve position responsive to knock to allow the combustion charge in the cylinder to rapidly flow into the manifold. Spark timing may be held at or around MBT while increasing the opening of the control valve. A duration of control valve opening as well as a degree of valve opening may be adjusted based on engine operating conditions and desired reduction in cylinder temperature and pressure that provides the required knock relief. As a result, the engine compression ratio may decrease to a threshold value leading to a reduction in cylinder temperature and pressure to minimize undesirable effects of engine knock. The combustion charge in the manifold may be flowed downstream to the turbine-generator, where the charge gas drives a turbine wheel to generate electric power which is distributed to power demand centers in the engine or vehicle. For example, the control valve may be opened more, or held open longer, until the indication of knock received from a knock sensor subsides (and for a duration thereafter). Then the control valve may be returned to the less open position and the cylinder compression ratio may be returned to the higher value that provides higher engine efficiency.

Boost pressure adjustments may also be concurrently performed. For example, responsive to the indication of knock, while the control valve is opened to reduce cylinder temperature and pressure, drop in boost pressure may be compensated for by increasing a throttle opening, reducing the opening of a compressor recirculation valve, and/or decreasing the opening of an exhaust waste-gate valve.

In an alternative embodiment, the spark timing may be adjusted by retarding spark ignition to reduce the compression ratio. A decrease in the compression ratio may lead to a reduction in cylinder temperature and pressure, thereby minimizing the effects of engine knock on engine performance. After adjusting the control valve timing and/or spark timing, the method 600 may proceed to 610.

Returning to 606, if engine knock is not detected, the method may proceed to 610. At 610, the method 600 may include determining if a fast torque transient is present. Fast torque transients may include a sudden increase in torque, or a sudden decrease in torque. For example, a fast torque transient may occur when a vehicle is brought to a halt responsive to a tip-out of an accelerator pedal or operator application of a brake pedal. A fast torque transient may alternatively occur when the vehicle accelerates after a stop, for example, during vehicle launch or responsive to a tip-in of an accelerator pedal. If a fast torque transient is present, method 600 proceeds to 612. Otherwise the method proceeds to 614 to resume nominal engine operation if the fast torque transient is not present. For example, when a torque transient is not present, spark timing may be returned to MBT (if it was previously retarded), and further the control valve may be returned to a nominal position based on the engine's knock propensity. For example, the control valve may be returned to a partially open position.

At 612, method 600 may include coordinating change in control valve timing, throttle position and boost pressure for a threshold duration responsive to the presence of a torque transient. The engine controller may make adjustments in control valve timing, throttle position and boost pressure for a duration that allows the actual engine torque to match desired engine torque. For example, responsive to a transient demand for negative torque, such as when a driver applies the brake pedal or tips out of an accelerator pedal, the controller may reduce the opening of the control valve (e.g., close the control valve) and adjust the throttle to a more closed position to reduce engine torque to allow the vehicle to stop. In an alternative example, when the driver applies the accelerator pedal to launch the vehicle, the controller may keep the control valve temporarily closed and adjust the throttle to an open position to increase engine torque, thereby allowing the vehicle to accelerate. Once the vehicle attains a threshold speed, the controller may adjust the control valve to a more open valve position to allow combustion charge from the engine cylinder to flow to the manifold coupled to the turbine-generator, thereby modulating the engine compression ratio while maintaining the actual engine torque at values close to the desired engine torque.

Next at 614, the engine resumes nominal operation, where the engine continues to combust air and fuel to produce torque needed to propel the vehicle. The control valve in each cylinder of the engine may be periodically adjusted to open and then close during engine operation. When the control valve is adjusted to the open valve position, combustion charge gas from the cylinder may flow into the manifold. A check valve (e.g., check valve/filter 326 shown in FIGS. 3-5) on the manifold to stops reverse flow of the combustion charge gas back into the combustion chamber. The check valve allows combustion charge gas flow downstream into the turbine-generator 332. A gas sensor (e.g., gas sensor 328 shown in FIGS. 3-5) coupled to the manifold 308, may be provided to detect any unburned fuel in the combustion charge gas, which may be combusted by an igniter (e.g., igniter 330 shown in FIGS. 3-5) prior to entry into the turbine-generator. Upon entry into the turbine-generator, the combustion charge gas drives a turbine wheel (e.g., turbine wheel 418 shown in FIGS. 4-5) to generate electric power which is distributed to power demands centers in the engine or vehicle. Any residual exhaust gas generated after the electrical power is produced is diverted to an EGR system, where the exhaust may be recirculated to an intake manifold.

In this way, the compression ratio in the engine may be varied by adjusting the control valve timing, throttle position and spark timing. The control valve may be adjusted to the open valve position to mitigate engine knock, and alleviate effects of high cylinder temperature and pressure which may occur during high compression ratios. When adjusted to the open valve position, combustion charge gas may be diverted from engine cylinders to the manifold, thereby allowing for a reduction in compression ratio and a decrease in cylinder temperature and pressure. The charge gas in the manifold may be diverted to the turbine-generator to produce electrical power. In this way, the engine system provides for a method of varying engine compression ratio to promote better engine performance while producing electrical power to operate engine components. It will be appreciated, that the bypass valve in the bypass conduit routing combustion charge around the turbine-generator may be closed during steps 608 and/or 612.

Referring now to FIG. 7, an example graphic depicting adjusting of a control valve timing, throttle position and spark timing to vary the compression ratio and torque in an engine is shown. The sequence of FIG. 7 may be provided by executing instructions in the system of FIGS. 1-5 according to the methods of FIG. 6. Vertical markers at times T0-T3 represent time of interest during the sequence. In all the plots discussed below, the horizontal axis represents time and time increases from the left side of each plot to the right side of each plot.

The first plot from the top of FIG. 7 depicts compression ratio versus time. The vertical axis represents compression ratio in an engine and the compression ratio increases in the direction of the vertical axis. Trace 702 represents the compression ratio.

The second plot from the top of FIG. 7 depicts a control valve position versus time. The vertical axis represents the control valve position. The control valve is adjusted to a closed valve position at the horizontal axis, and adjusted to an open valve position in the direction of the vertical axis. A degree of valve opening of the control valve increases in the direction of the vertical axis. Trace 704 represents the control valve position. In alternative embodiments, the control valve may be referred to as a cylinder bleed valve.

The third plot from the top of FIG. 7 depicts a throttle valve position versus time. The vertical axis represents the throttle valve position. The throttle valve is adjusted to a closed valve position at the horizontal axis, and adjusted to an open valve position in the direction of the vertical axis. A degree of valve opening of the throttle valve increases in the direction of the vertical axis. Trace 706 represents the throttle position.

The fourth plot from the top of FIG. 7 depicts engine torque versus time. The vertical axis represents engine torque and the engine torque increases in the direction of the vertical axis. Trace 708 represents a desired engine torque and trace 710 represents an actual engine torque.

The fifth plot from the top of FIG. 7 depicts spark timing versus time. The vertical axis represents spark timing and the spark timing increases in the direction of the vertical axis. Trace 716 represents an actual spark timing and trace 718 represents a spark timing for MBT.

At time between T0 and T1, the engine may be operating with a steady compression ratio (702), below a threshold level (703) of the compression ratio. For example, the compression ratio (702) may be set at a first level lower than the threshold level (703). The actual engine torque (710) may be at a steady level, and may be equal to the desired engine torque (708). The control valve position (704) may be kept at a first open valve position that maintains the actual engine torque (710) at the steady level equal to the desired engine torque (708). For example, the control valve position (704) may be adjustable between an angle of 0 degrees and 60 degrees. When set at the 0 degree angle, the control valve is adjusted to a closed valve position, and when set at the 60 degree angle, the control valve is adjusted to a more open valve position. In other examples, the control valve position (704) may be adjustable between a minimum angle and a maximum angle, where the minimum angle allows for no flow or a minimum flow rate of charge gas from a cylinder into a manifold (e.g., manifold 308 shown in FIG. 3), and the maximum angle allows for a maximum flow rate of charge gas from the cylinder into the manifold.

Further, the throttle position (706) may be maintained at an open position that allows a steady flow of air into the intake manifold, where the air is flowed downstream to a combustion chamber where the air mixes with fuel to form an air-fuel mixture which combusts to produce engine torque (710). The spark timing (716) may be set at the spark timing for MBT (718).

When the control valve is adjusted to the open valve position, combustion charge in the combustion chamber may be diverted from the chamber into the manifold (e.g., manifold 308 shown in FIG. 3) while maintaining the compression ratio (702) at the steady level below the threshold level (703). The combustion charge gas in the manifold may be flowed downstream to a turbine-generator (e.g., turbine-generator 332 shown in FIGS. 3-5) when a check valve (e.g., check valve/filter 326 shown in FIGS. 3-5) coupled to the manifold is adjusted to an open valve position. Upon entry into the turbine-generator, the combustion charge gas turns a turbine wheel (e.g., turbine wheel 418 shown in FIGS. 4-5) of the turbine-generator to produce electrical power which may be distributed to power demand centers in the engine or vehicle.

At T1, the compression ratio (702) may be increased above the threshold level (703) to increase the actual engine torque (710) in the engine. As an example, the compression ratio (702) may increase from the first level to a second level higher than the threshold level (703). In one example, the increase in compression ratio (702) may occur when a flow rate of the combustion charge gas (flowing from the combustion chamber into the manifold) is decreased, and the throttle position (706) is adjusted to a more open valve position, thereby allowing a larger flow of air into the combustion chamber via the intake manifold. The control valve position (704) may be adjusted from the open position to a fully closed position, to stop flow of combustion charge gas from the combustion chamber into the manifold.

Between T1 and T2, the compression ratio (702) may be maintained at the second level above the threshold level (703). The control valve (704) may be kept in the closed valve position and the throttle position (706) may be maintained at a level higher the initial throttle position before T1. Consequently, the actual engine torque (710), may initially increase rapidly before attaining a steady level higher than the initial torque observed between T0 and T1. The actual engine torque (710) may slightly depart from than the desired engine torque (708) profile. A first torque increase 712 may be attributed to the closing of the control valve, and a second torque increase 714 may be attributed to the adjustment in the throttle position. The first torque increase 712 may be larger than the second torque increase 714.

Closing the control valve to stop flow of combustion charge gas from the combustion chamber into the manifold, may have an immediate impact of increasing compression ratio (702), which may lead to a rapid increase in the actual engine torque (710). In contrast, adjusting the throttle position (706) to allow for a larger flow of air into the combustion chamber via the intake manifold may occur over a long duration due to increased travel time of air through the intake manifold before the air reaches the combustion chamber. The increased mass of air flowing into the combustion chamber may mix with fuel to form an air-fuel which is combusted to produce a large amount of engine torque (710). However, the increase in the actual engine torque due to adjusting the throttle position may be lower compared to the increase in actual engine torque based on closing the control valve. The spark timing (716) may be gradually retarded to a level below the MBT level (718) while maintaining the actual engine torque (710) at a steady level close to the desired engine torque (708).

At T2, the compression ratio (702) may decrease to a level below the threshold level (703) when the control valve is adjusted from the fully closed valve position to an open valve position. As an example, the compression ratio (702) may decrease from the second level to the first level, when the control valve is adjusted to a second open valve position with a smaller degree of valve opening compared to the first valve opening observed prior to T1. In other examples, the varying of the compression ratio may be conducted in response to an indication of knock, the indication of knock including one of detected knock and anticipated knock, the varying including decreasing the compression ratio responsive to the indication of knock by increasing an opening of the bleed valve. In further examples, one or more of a degree of opening of the bleed valve and a duration of opening of the bleed valve may be adjusted based on the indication of knock, the bleed valve held more open or opened for a longer duration until the indication of knock is below a threshold. The spark timing (716) may be adjusted to match the spark MBT level (718). As a result, the actual engine torque (710) may be maintained at values close to the desired engine torque (708).

After T2, the compression ratio (702) may be maintained at the first level by keeping the control valve position (704) at the second valve open position and gradually adjusting the throttle position (706) to a less open position to reduce air flow into combustion chamber (via the intake manifold). The air flow rate into the combustion chamber may be lower compared to the air flow rate observed between T1 and T2, for example. Further, the spark timing (716) may be maintained at the spark MBT level (718). Consequently, the compression ratio (702) is maintained at the second steady level, and the actual engine torque (710) may match the desired engine torque (708).

In this way, the compression ratio in the engine may be varied by adjusting the control valve timing, throttle position and spark timing to maintain the actual engine torque close to the desired engine torque. The combustion charge gas bled from the combustion chamber when the control valve and check valve on the manifold are adjusted to open valve positions, may flow into the turbine-generator, where the charge gas turns the turbine wheel to produce electrical power. In this way, the compression ratio in the engine may be varied to allow for better engine performance while producing electrical power which may be distributed power demand centers in the engine.

FIGS. 8 and 9 show methods 800 and 900, respectively, for operating an engine system. Specifically, the methods 800 and 900 depict example methods for controlling compression ratio in an engine having a control valve (e.g., control valve 316 shown in FIGS. 3-4) and a bypass valve (e.g., bypass valve 352, shown in FIGS. 3-5). The methods may enable engine compression ratio to be adjusted to promote better engine performance and enable the flow of the combustion charge bleed from the cylinder to be selectively routed around the turbine-generator to improve engine starting.

Turning specifically to FIG. 8, method 800 includes determining desired engine torque based on engine operating conditions at 802. As an example, engine operating conditions may include but are not limited to engine speed, engine load, accelerator position, vehicle speed, engine temperature, EGR flowrate, compressor boost, knock propensity, start-up request, and combustion charge mass flow.

At 804 the method includes varying a compression ratio of a cylinder by selectively releasing combustion charge from the cylinder through a cylinder bleed valve of a cylinder. Specifically, in one example, varying the compression ratio of the cylinder may include decreasing the compression ratio of the combustion chamber by increasing a degree of opening of the cylinder bleed valve to release combustion charge from the cylinder. The cylinder bleed valve may be opened to a greater extent when boost generated by a compressor upstream of the cylinder exceeds a threshold value. In this way, when boost exceeds a threshold combustion ratio can be reduced to avoid knock, for instance. As a result, engine operation can be improved. Varying the compression ratio of the cylinder may also include decreasing a degree of opening of the cylinder bleed valve to increase the compression ratio of the cylinder. Various engine systems may be adjusted in tandem with the increase in compression ratio. For instance, a degree of intake and exhaust valve overlap and/or EGR flow may be increased while the compression ratio is increased. In this way, combustion efficiency can be increased. Additionally or alternatively, ignition timing may be advanced in conjunction with an increase in the compression ratio. As a result, combustion efficiency may be further increased.

At 806, the method includes varying combustion charge flow through a turbine-generator bypass conduit bypassing the turbine-generator based on engine operating conditions. Varying the combustion charge flow through the turbine-generator bypass conduit may include steps 808-822.

At 808 the method includes determining if a first or a second operating condition is occurring in the engine. The first operating condition may include a condition when the engine is performing start-up and the second operating condition may include a condition subsequent to engine start-up. In another example, the first operating condition may include a condition when an EGR flowrate is greater than a threshold value and the second operating condition may include a condition when the EGR flowrate is less than the threshold value. In yet another example, the first operating condition may include a condition when an amount of energy stored in an energy storage device is above a threshold value and the second operating condition may include a condition when the amount of energy stored in the energy storage device is less than the threshold value. In one example, the bypass valve may be active (e.g., opened) during cold starts as well as subsequent re-starts of a hot, thermal cycled engine. In another example, the bypass valve may also be active in the event that the turbine-generator is generating more power than can be used and/or stored, at that time. For instance, an energy storage device receiving electrical energy from the turbine-generator may reach a maximum storage capacity and the bypass valve may be opened in response to the energy storage device reaching the maximum storage capacity to prevent generation of excess energy by the turbine-generator. In another example, the energy requirements of an engine system receiving energy from the turbine-generator may decrease and the bypass valve may therefore be opened to reduce the amount of energy produced by the turbine-generator and sent to the engine system. In yet another example, energy demands on the turbine-generator may decrease to substantially zero, and the bypass valve may be correspondingly fully opened to suspend operation of the turbine-generator. In another example, an amount of combustion charge flowing through bypass conduit may be adjusted based on EGR system capabilities. In yet another example, a detected failure in the turbine-generator may prompt the bypass valve to be opened and/or a flag may be set in the vehicle to alert a vehicle operator of failure of the system. Setting the flag may trigger activation of an indicator (e.g., visual and/or audio indicator).

If the first operating condition is occurring, the method proceeds to 810. At 810, the method includes directing combustion charge from the cylinder bleed valve to the turbine-generator bypass conduit. Directing combustion charge from the cylinder bleed valve to the turbine-generator bypass conduit may include opening a bypass valve positioned in the turbine-generator bypass conduit, at 812.

On the other hand, if the second operating condition is occurring, the method advances to 814. At 814, the method includes directing combustion charge from the cylinder bleed valve to the turbine-generator. Directing combustion charge to the turbine-generator may include closing the turbine-generator bypass valve, at 816. Next, at 818, the method includes transforming the combustion charge into electrical power at the turbine-generator. In this way, energy can be extracted from the combustion charge bleed from the cylinder to increase engine efficiency. At 820, the method includes determining if a third operating condition is occurring in the engine. The third operating condition may include a condition where the temperature of the turbine-generator is greater than a threshold value. If the third operating condition is not occurring (NO at 820) the method returns to 820. It will be appreciated that the bypass valve may remain closed and the turbine-generator may continue the transformation of the combustion charge into electric power when returning to 820.

However, if the third operating condition is occurring (YES at 820) the method proceeds to 822. At 822, the method includes directing a first portion of combustion charge from the cylinder bleed valve to the turbine-generator bypass conduit and a second portion of combustion charge from the cylinder bleed valve to the turbine-generator. In this way, the amount of combustion charge flowing through the turbine-generator may be reduced when the turbine-generator is experiencing an over-temperature condition, for instance. Method 800 enables combustion charge bleed from a cylinder to be routed around the turbine-generator to improve engine operation when operation of the turbine-generator may negatively affect combustion operation. For instance, combustion charge may be routed around the turbine-generator during start-up to reduce torque requirements for engine starting. Combustion charge may also be routed around the turbine-generator when the turbine-generator is overheating and/or when the EGR flowrate is below a threshold that would cause misfire. Thus, the technical effect of routing combustion charge through a turbine-generator bypass conduit is to increase start-up efficiency, reduce the likelihood of turbine-generator overheating, and/or increase combustion efficiency.

Turning to FIG. 9, method 900 includes at 902 determining engine operating conditions. Various exemplary operating conditions are discussed above with regard to FIGS. 6 and 8.

Next, at 904, the method includes determining if engine start-up has been requested. The start-up request may be triggered by an ignition switch sending a key-on signal to the controller. For instance, it may be determined that start-up is requested when a key-on condition is sensed. Starter-motor configuration and/or engine speed may also be used to ascertain if start-up has been requested.

If it is determined that start-up has not been requested (NO at 904) the method returns to 902. On the other hand, if it is determined that start-up has been requested (YES at 904) the method advances to 906. At 906, the method includes, opening a cylinder bleed valve to decrease the compression ratio of the cylinder. As previously discussed, the cylinder bleed valve enables combustion charge to bleed from the cylinder and then subsequently routed back to the intake system by way of an EGR conduit. Next at 908, the method includes, opening a bypass valve in a turbine-generator bypass conduit to route combustion charge around the turbine-generator. In this way, the engine torque needed to start the engine may be reduced, thereby improving engine starting operation.

At 910, the method includes, determining if start-up operation in the engine has been discontinued. Indicators of cessation of start-up operation may include intake airflow, engine speed, engine temperature, and/or exhaust gas flow exceeding threshold values. For instance, it may be determined that start-up has stopped when the engine is producing torque.

If it is determined that start-up operation has not been discontinued (NO at 910) the method moves to 911. At 911, the method includes maintaining the bypass valve in an open position. After 911, the method returns to 910. Conversely, if it is determined that start-up operation has been discontinued (YES at 910) the method advances to 912. At 912, the method includes, closing the bypass valve in the turbine-generator bypass conduit. For instance, closing the bypass valve may include adjusting the valve to substantially inhibit combustion charge flow through the turbine-generator bypass conduit. However, in other examples, closing the bypass valve may include adjusting the valve to permit a smaller portion of the combustion charge to flow through the turbine-generator bypass conduit than the portion of the combustion charge flowing to the turbine-generator.

Next, at 914, the method includes initiating operation of the turbine-generator to enable energy to be extracted from the combustion charge. For instance, the igniter positioned upstream of the turbine-generator may be turned on to combust gas flowing into the turbine-generator. In turn, the turbine-generator converts the combusted gas into electrical energy.

Next, at 916, the method determines if the engine is above a threshold temperature. If it is determined that the engine is not above the threshold temperature (NO at 916) the method moves to 917. At 917, the method includes maintaining the bypass valve in the closed position and operation of the turbine-generator. After 917, the method returns to 916. However, if it is determined that the engine is above the threshold temperature (YES at 916) the method proceeds to 918. At 918, the method includes, closing the cylinder bleed valve. Closing the cylinder bleed valve may include substantially inhibiting combustion charge flow through the valve to the bleed manifold. However, in other examples, closing the cylinder bleed valve may include blocking charge gas flow through the valve to a greater extent to increase compression ratio of the cylinder. In this way, compression ratio of the cylinder is increased to facilitate an increase in combustion efficiency during desired time intervals, such as during lean burn conditions. As such, the compression ratio can be fine-tuned to increase combustion efficiency over a wide range of engine operating conditions.

At 920 the method includes determining if boost generated by a compressor and provided to the cylinder is above a threshold value. In other words, it may be determine if the boost generated by the engine is above an acceptable level. If the boost is not greater than the threshold value (NO at 920) the method advances to 921. At 921, the method includes maintaining the bleed valve in the closed position. However, if the boost is greater than the threshold value (YES at 920) the method advances to 922. At 922, the method includes adjusting the cylinder bleed valve. For instance, a degree of opening of the cylinder bleed valve may be increased to avoid knock. In this way, the compression ratio of the engine may be decreased when the boost has surged above levels that may damage the engine. After, both steps 921 and 922 the method ends.

Turning to FIG. 10, an example graph depicting adjusting of a control valve timing, compression ratio, bypass valve timing, and engine temperature, is shown. The sequence of FIG. 10 may be provided by executing instructions in the system of FIGS. 1-5, according to the methods of FIGS. 8 and/or 9. Vertical markers at times T0-T2 represent times of interest during the sequence. In all the plots discussed below, the horizontal axis represents time and time increases from the left side of each plot to the right side of each plot.

The first plot from the top of FIG. 10 depicts compression ratio versus time. The vertical axis represents compression ratio in an engine and the compression ratio increases in the direction of the vertical axis. Trace 1002 represents the compression ratio.

The second plot from the top of FIG. 10 depicts a control valve position versus time. The vertical axis represents the control valve position. The control valve is adjusted to a closed valve position at the horizontal axis, and adjusted to an open valve position in the direction of the vertical axis. A degree of valve opening of the control valve increases in the direction of the vertical axis. Trace 1004 represents the control valve position. It will be appreciated that the control valve may be referred to as a cylinder bleed valve.

The third plot from the top of FIG. 10 depicts a bypass valve position versus time. The vertical axis represents the bypass valve position. The bypass valve is adjusted to a closed valve position at the horizontal axis, and adjusted to an open valve position in the direction of the vertical axis. A degree of valve opening of the bypass valve increases in the direction of the vertical axis. Trace 1006 represents the throttle position.

The fourth plot from the top of FIG. 10 depicts engine temperature versus time. The vertical axis represents engine temperature and the engine temperature increases in the direction of the vertical axis. Trace 1008 represents the engine temperature 1008.

T0 represents a time when engine start-up is initiated. As shown, both the control-valve and the bypass valve are opened during start-up to reduce torque requirements for engine start-up. As a result, engine start-up efficiency is increased. After start-up, at time T1, the bypass valve is closed and the control valve remains open. At time T2, the control valve is closed when the engine reaches a threshold temperature 1010. In this way, the compression ratio of the engine may be kept low while the engine is warming up and increased subsequent to warm up, to increase combustion efficiency.

The invention will further be described in the following paragraphs. In one aspect, a method for operating of an engine system in an engine comprises varying a compression ratio of a cylinder by selectively releasing combustion charge from the cylinder through a cylinder bleed valve of a cylinder head, the cylinder bleed valve coupled to a bleed manifold with a turbine-generator; and varying combustion charge flow through a turbine-generator bypass conduit bypassing the turbine-generator based on engine operating conditions.

In another aspect, an engine system in an engine comprises an engine cylinder having an intake valve receiving air from an intake manifold and an exhaust valve releasing combustion charge into an exhaust manifold; an exhaust gas recirculation (EGR) passage recirculating exhaust gas from the exhaust manifold to the intake manifold; a cylinder head including a cylinder bleed valve coupled to a bleed manifold, the bleed manifold including an igniter coupled upstream of a turbine-generator, an outlet of the bleed manifold coupled to the EGR passage; a bypass conduit coupled upstream and downstream of the igniter and the turbine-generator; a bypass valve positioned in the bypass conduit; and a controller with computer readable instructions stored on non-transitory memory for: adjusting operation of the bypass valve based on engine temperature.

In another aspect, a method for operating an engine, comprises during engine start-up operation, opening a bypass valve in a turbine-generator bypass conduit coupled upstream and downstream of a turbine-generator in a bleed manifold receiving combustion charge from a cylinder bleed valve coupled to a cylinder head, to direct combustion charge through the turbine-generator bypass conduit, the cylinder bleed valve distinct from an exhaust valve; and subsequent to engine start-up operation, closing the bypass valve to direct combustion charge to the turbine-generator.

In any of the aspects or combinations of the aspects, varying the combustion charge flow through the turbine-generator bypass conduit may include during a first condition, directing combustion charge from the cylinder bleed valve to a turbine-generator bypass conduit bypassing a turbine-generator; and during a second condition, directing combustion charge from the cylinder bleed valve to the turbine-generator.

In any of the aspects or combinations of the aspects, the first condition may include an operating condition when the engine is performing start-up and the second condition may include an operating condition subsequent to start-up.

In any of the aspects or combinations of the aspects, the first condition may include an operating condition where an exhaust gas recirculation (EGR) flowrate in an EGR passage is greater than a threshold EGR flowrate, the EGR passage positioned downstream of the turbine-generator and the turbine-generator bypass conduit.

In any of the aspects or combinations of the aspects, directing combustion charge from the cylinder bleed valve to the turbine-generator bypass conduit may include opening a bypass valve in the turbine-generator bypass conduit and directing combustion charge from the cylinder bleed valve to the turbine-generator includes closing the bypass valve.

In any of the aspects or combinations of the aspects, the method may further include during a third condition directing a first portion of combustion charge from the cylinder bleed valve to the turbine-generator bypass conduit and a second portion of combustion charge from the cylinder bleed valve to the turbine-generator.

In any of the aspects or combinations of the aspects, the third condition may include an operating condition where the turbine-generator is above a threshold temperature.

In any of the aspects or combinations of the aspects, the method may further include transforming the combustion charge into electrical power at the turbine-generator.

In any of the aspects or combinations of the aspects, varying combustion charge flow through the turbine-generator bypass conduit may include adjusting a bypass valve in the turbine-generator bypass conduit based on an energy level in an energy storage device receiving electrical power from the turbine-generator.

In any of the aspects or combinations of the aspects, varying the compression ratio of the cylinder by selectively releasing combustion charge from the cylinder through the cylinder bleed valve may include adjusting the cylinder bleed valve to increase a degree of opening of the cylinder bleed valve when boost generated by a compressor upstream of the cylinder exceeds a threshold value.

In any of the aspects or combinations of the aspects, varying the compression ratio of the cylinder by selectively releasing combustion charge from the cylinder through the cylinder bleed valve may include adjusting the cylinder bleed valve to decrease a degree of opening of the cylinder bleed valve while advancing ignition timing.

In any of the aspects or combinations of the aspects, varying the compression ratio of the cylinder by selectively releasing combustion charge from the cylinder through the cylinder bleed valve may include adjusting the cylinder bleed valve to decrease a degree of opening of the cylinder bleed valve during an increase in intake and exhaust valve opening overlap.

In any of the aspects or combinations of the aspects, the method may further include varying a compression ratio of a cylinder by selectively releasing combustion charge from the cylinder through the cylinder bleed valve.

In any of the aspects or combinations of the aspects, the method may further include transforming the combustion charge into electrical power at the turbine-generator.

In any of the aspects or combinations of the aspects, adjusting operation of the bypass valve based on engine temperature may include opening the bypass valve during engine start-up operation; and closing the bypass valve subsequent to engine start-up operation.

In any of the aspects or combinations of the aspects, the controller may further include computer readable instructions stored on non-transitory memory for: operating the turbine-generator and the igniter to transform the combustion charge into electrical power at the turbine-generator.

In any of the aspects or combinations of the aspects, the engine system may further include a compressor having a wastegate positioned upstream of the intake valve.

In any of the aspects or combinations of the aspects, the engine system may further include an energy storage device coupled to an electric motor providing motive power to vehicle wheels.

FIGS. 1-5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating of an engine system in an engine, comprising:
varying a compression ratio of a cylinder by selectively releasing combustion charge from the cylinder through a cylinder bleed valve of a cylinder head, the cylinder bleed valve coupled to a bleed manifold with a turbine-generator; and
varying combustion charge flow through a turbine-generator bypass conduit bypassing the turbine-generator based on engine operating conditions.

2. The method of claim 1, where varying the combustion charge flow through the turbine-generator bypass conduit includes,
during a first condition, directing combustion charge from the cylinder bleed valve to a turbine-generator bypass conduit bypassing a turbine-generator; and
during a second condition, directing combustion charge from the cylinder bleed valve to the turbine-generator.

3. The method of claim 2, where the first condition includes an operating condition when the engine is performing start-up and the second condition includes an operating condition subsequent to start-up.

4. The method of claim 2, where the first condition includes an operating condition where an exhaust gas recirculation (EGR) flowrate in an EGR passage is greater than a threshold EGR flowrate, the EGR passage positioned downstream of the turbine-generator and the turbine-generator bypass conduit.

5. The method of claim 2, where directing combustion charge from the cylinder bleed valve to the turbine-generator bypass conduit includes opening a bypass valve in the turbine-generator bypass conduit and directing combustion charge from the cylinder bleed valve to the turbine-generator includes closing the bypass valve.

6. The method of claim 2, further comprising during a third condition directing a first portion of combustion charge from the cylinder bleed valve to the turbine-generator bypass conduit and a second portion of combustion charge from the cylinder bleed valve to the turbine-generator.

7. The method of claim 6, where the third condition includes an operating condition where the turbine-generator is above a threshold temperature.

8. The method of claim 1, further comprising, transforming the combustion charge into electrical power at the turbine-generator.

9. The method of claim 8, where varying combustion charge flow through the turbine-generator bypass conduit includes adjusting a bypass valve in the turbine-generator bypass conduit based on an energy level in an energy storage device receiving electrical power from the turbine-generator.

10. The method of claim 1, where varying the compression ratio of the cylinder by selectively releasing combustion charge from the cylinder through the cylinder bleed valve includes adjusting the cylinder bleed valve to increase a degree of opening of the cylinder bleed valve when boost generated by a compressor upstream of the cylinder exceeds a threshold value.

11. The method of claim 1, where varying the compression ratio of the cylinder by selectively releasing combustion charge from the cylinder through the cylinder bleed valve includes adjusting the cylinder bleed valve to decrease a degree of opening of the cylinder bleed valve while advancing ignition timing.

12. The method of claim 1, where varying the compression ratio of the cylinder by selectively releasing combustion charge from the cylinder through the cylinder bleed valve includes adjusting the cylinder bleed valve to decrease a degree of opening of the cylinder bleed valve during an increase in intake and exhaust valve opening overlap.

13. A method for operating an engine, comprising:
during engine start-up operation,
opening a bypass valve in a turbine-generator bypass conduit coupled upstream and downstream of a turbine-generator in a bleed manifold receiving combustion charge from a cylinder bleed valve coupled to a cylinder head, to direct combustion charge through the turbine-generator bypass conduit, the cylinder bleed valve distinct from an exhaust valve; and
subsequent to engine start-up operation,
closing the bypass valve to direct combustion charge to the turbine-generator.

14. The method of claim 13, further comprising varying a compression ratio of a cylinder by selectively releasing combustion charge from the cylinder through the cylinder bleed valve.

15. The method of claim 14, further comprising transforming the combustion charge into electrical power at the turbine-generator.

16. An engine system in an engine, comprising:
an engine cylinder having an intake valve receiving air from an intake manifold and an exhaust valve releasing combustion charge into an exhaust manifold;
an exhaust gas recirculation (EGR) passage recirculating exhaust gas from the exhaust manifold to the intake manifold;
a cylinder head including a cylinder bleed valve coupled to a bleed manifold, the bleed manifold including an igniter coupled upstream of a turbine-generator, an outlet of the bleed manifold coupled to the EGR passage;
a bypass conduit coupled upstream and downstream of the igniter and the turbine-generator;
a bypass valve positioned in the bypass conduit; and
a controller with computer readable instructions stored on non-transitory memory for:
adjusting operation of the bypass valve based on engine temperature.

17. The engine system of claim 16, where adjusting operation of the bypass valve based on engine temperature includes;
opening the bypass valve during engine start-up operation; and
closing the bypass valve subsequent to engine start-up operation.

18. The engine system of claim 16, where the controller further includes computer readable instructions stored on non-transitory memory for:
operating the turbine-generator and the igniter to transform the combustion charge into electrical power at the turbine-generator.

19. The engine system of claim 16, further comprising a compressor having a wastegate positioned upstream of the intake valve.

20. The engine system of claim 16, further comprising an energy storage device coupled to an electric motor providing motive power to vehicle wheels.

\* \* \* \* \*